US006587778B2

(12) United States Patent
Stallard et al.

(10) Patent No.: US 6,587,778 B2
(45) Date of Patent: Jul. 1, 2003

(54) GENERALIZED ADAPTIVE SIGNAL CONTROL METHOD AND SYSTEM

(75) Inventors: Charlie Monroe Stallard, Colorado Springs, CO (US); Larry Evans Owen, Colorado Springs, CO (US)

(73) Assignee: ITT Manufacturing Enterprises, Inc., DE (US)

(*) Notice: Subject to any disclaimer, the term of this patent is extended or adjusted under 35 U.S.C. 154(b) by 0 days.

(21) Appl. No.: 09/737,811

(22) Filed: Dec. 18, 2000

(65) Prior Publication Data

US 2002/0116118 A1 Aug. 22, 2002

Related U.S. Application Data

(60) Provisional application No. 60/172,149, filed on Dec. 17, 1999.

(51) Int. Cl.[7] ................................................ G06F 19/00

(52) U.S. Cl. ........................ 701/117; 701/118; 340/901

(58) Field of Search ................................ 701/117, 118, 701/119; 340/901, 906, 902

(56) References Cited

U.S. PATENT DOCUMENTS

| | | | | |
|---|---|---|---|---|
| 5,092,705 | A | * 3/1992 | Raswant | |
| 5,182,555 | A | * 1/1993 | Sumner | 340/905 |
| 5,416,711 | A | * 5/1995 | Gran et al. | 340/905 |
| 5,539,398 | A | * 7/1996 | Hall et al. | |
| 5,583,494 | A | * 12/1996 | Mizutani et al. | 340/990 |
| 5,777,564 | A | * 7/1998 | Jones | 340/907 |
| 5,801,943 | A | * 9/1998 | Nasburg | 340/910 |
| 5,822,711 | A | * 10/1998 | Ochoa-Chavez | 340/916 |
| 5,892,226 | A | * 4/1999 | Robinson et al. | 250/338.3 |
| 5,986,575 | A | * 11/1999 | Jones et al. | |
| 5,999,877 | A | * 12/1999 | Takahashi et al. | 340/905 |
| 6,195,020 | B1 | * 2/2001 | Brodeur, Sr. et al. | |
| 6,204,778 | B1 | * 3/2001 | Bergan et al. | |
| 6,223,125 | B1 | * 4/2001 | Hall | |
| 6,226,575 | B1 | * 5/2001 | Lu et al. | |
| 6,233,517 | B1 | * 5/2001 | Froeberg | |
| 6,243,026 | B1 | * 6/2001 | Jones et al. | 340/906 |
| 6,281,809 | B1 | * 8/2001 | Potter, Sr. | 340/540 |
| 6,320,515 | B1 | * 11/2001 | Olsson | 340/905 |
| 6,326,903 | B1 | * 12/2001 | Gross et al. | 340/902 |
| 6,342,845 | B1 | * 1/2002 | Hilliard et al. | 340/933 |

FOREIGN PATENT DOCUMENTS

| | | | |
|---|---|---|---|
| EP | 1063626 | * 12/2000 | G08G/1/16 |

OTHER PUBLICATIONS

Owens, Larry E., et al., "An Evaluation of Real–Time Traffic Adaptive Control Prototypes", Transportation Research Board, 1997.

Yang, Q., et al., "A Microscopic Traffic Simulator for Evaluation of Dynamic Traffic Management Systems", Transportation Research C, vol. 4, pp. 1–32, 1996.

Hansen, B.G., et al., "SCOOT Real–time Adaptive Control in a CORSIM Simulation Environment", Transportaion Research Board, 79th Annual Meeting, pp. 1–14, Jan. 9–13, 2000.

* cited by examiner

*Primary Examiner*—William A. Cuchlinski, Jr.
*Assistant Examiner*—Olga Hernandez
(74) *Attorney, Agent, or Firm*—Edell, Shapiro & Finnan, LLC

(57) ABSTRACT

The invention relates to a rule-based method for effective distributed adaptive signal control of traffic networks, and an apparatus using the method. Queue estimates and sets of rules are used to determine the signal state at each intersection in the network. The queue estimation uses real-time data from detectors upstream from an intersection to estimate the number of vehicles approaching the intersection and the vehicles in queue. Each detected vehicle is treated as a group of "partial" vehicles corresponding to approved movements that the vehicle might make. The queue estimation and control logic that determine the signal state can be implemented as a distributed system. The signal control logic consists of a set of rules for uncongested control and a process that creates a fixed time plan for congested control.

15 Claims, 19 Drawing Sheets

GENERALIZED ADAPTIVE SIGNAL CONTROL METHOD AND SYSTEM

CROSS REFERENCE TO RELATED APPLICATIONS

This application claims priority from U.S. Provisional Patent Application Ser. No. 60/172,149, entitled "Generalized Adaptive Signal Control Method Project (GASCAP)," filed Dec. 17, 1999. The disclosure of that provisional patent application is incorporated herein by reference in its entirety.

BACKGROUND OF THE INVENTION

1. Field of the Invention

The present invention relates to adaptive control systems and, more particularly, to adaptively controlling, in real-time, traffic signal control systems using rules and employing queue estimation.

2. Description of the Related Art

There are very few distributed fully-adaptive traffic control strategies in existence today. The processes in use typically are based on optimizing performance based on some objective function. The present invention departs from this approach by using a rule-based method for effective distributed adaptive signal control of traffic networks.

Most vehicular traffic signal control systems in the United States use time-based signal control, where a signal-timing plan is developed for a certain set of fixed traffic conditions. That is, traffic signals typically are controlled using a predetermined plan to change the traffic signal (i.e., the well-known red, yellow and green lights), where that plan is determined in advance based on historic traffic patterns and the time-of-day. That type of traffic control is not capable of responding effectively to short-term changes in traffic demand, and maintenance of such systems, which involves collecting new traffic volume data and modifying the current time-based control, is resource intensive. In addition, increasing traffic congestion is a recurring problem in most metropolitan and suburban cities, and modifications to the current infrastructure to increase capacity is typically very expensive and often not possible. However, technological advances in communications and electronics make it possible to consider advanced signal control systems that better respond to time-varying traffic demands, reduce maintenance costs, and increase the capacity of the current infrastructure.

Initial attempts at adaptive control were based on main frame computer technology of the 1970s. Typically, these systems were centralized in architecture, such as in the Split Cycle Offset Optimization Technique (e.g. SCOOT). Centralized traffic control systems compute the signal states for a region of intersections for a period of time (usually at least one cyclelength) and then download those signal states to each intersection. The number of intersections that can be served by this architecture is limited by the processing speed of the computer at the central site and the communications network that transfers the information to the intersections. In a distributed system, each intersection controller contains the control logic and decides what its signal state should be. There are of course, hybrids of the distributed/centralized architectures, since for any practical system some of the intelligence for the signal system must reside at the central site. However, distributed adaptive control can potentially serve an unlimited number of intersections, because most of the control logic is distributed locally at each intersection.

Currently there are very few distributed fully-adaptive real-time traffic control algorithms in existence. The existing algorithms (RHODES from the University of Arizona and OPAC from PB Farradyne) are based on optimizing the performance of some objective function. As a result, these algorithms are very resource intensive, and often cannot be implemented in more restrictive embedded systems.

The OPAC process does not perform any explicit queue estimation, because it is primarily based on the flow profiles within the network. The flow profiles for the network are predicted ahead for the next cyclelength and the splits and offsets for the control of traffic are computed based on those predictions. OPAC is a very conservative method. For example, it does not vary the phase order, and it also restricts the amount the cyclelength can vary from cycle to cycle.

RHODES is a predictive optimizer. It computes queue estimates for the network using activations from upstream detectors, and uses the idea of a "partial" vehicle to make those estimates. In addition, RHODES uses a dynamic program with a single state variable that tries every possible phase combination, using a particular measure of effectiveness (MOE) (e.g., travel time or delay) to arrive at the optimum phase. In order to find the optimum phase, RHODES must try every possible phase combination to identify the optimum phase. Thus, RHODES must be run on a very powerful, and hence, complex and expensive computer system. However, often the traffic controllers that are presently installed at an intersection are not powerful enough to effectively run the optimizations required by RHODES. Accordingly, there is a need for a distributed fully adaptive real-time traffic control process that can be performed using existing traffic controllers and that responds in real-time to traffic conditions.

SUMMARY OF THE INVENTION

Therefore, in light of the above, and for other reasons that will become apparent when the invention is fully described, an object of the invention is to effectively control traffic for a variety of traffic conditions and traffic networks using estimates of traffic conditions based on real-time or near real-time traffic measurements.

Another object of the invention is to estimate traffic patterns based on real-time, or near real-time, observations, while being insensitive to large short-term variations in traffic conditions.

Still another object of the invention is to select an optimal traffic signal state based on estimated real-time traffic conditions.

Yet another object of the invention is to control a traffic signal state using measurements from a minimum the number of upstream detectors installed across each lane for each approach to an intersection.

A further object of the invention is to control a traffic signal based on real-time traffic conditions including congested and uncongested traffic conditions.

A still further object of the invention is to use adaptively control the state of a traffic signal based on real-time, or near real-time traffic measurements, using existing traffic controllers already installed at numerous intersections. Accordingly, another object of the invention is to use minimal processor (CPU) speed and resources to run a real-time adaptive traffic signal control process that can be deployed in a variety of embedded environments.

Still another object of the invention is to reduce the delay drivers experience at traffic signal controlled intersections, and increase the number of trips that a network of traffic signals operating according to the invention can support.

The aforesaid objects are achieved individually and in combination, and it is not intended that the present invention be construed as requiring two or more of the objects to be combined unless expressly required by the claims attached hereto.

The present invention concerns a real-time adaptive traffic signal control method that determines the near optimal signal-state at an intersection. The invention achieves the objects described above by employing a rule-based method and queue estimation that can be used in a distributed environment and requires a minimal number of detectors. For uncongested traffic conditions the method estimates the number of approaching vehicles and the number of vehicles in queue, and uses a set of rules to effectively control traffic. The occupancy of upstream detectors on opposing approaches are used to determine if an intersection is experiencing congestion. An approach refers to a link (e.g., a southbound approach to an intersection). An opposing approach refers to approaches that intersect. For example, the opposing approaches for northbound traffic would be the east and westbound approaches. For congested intersections signal control logic creates a fixed time plan for the intersection. This method of effective real-time adaptive control can substantially increase the capacity and efficiency of a signalized intersection. The method estimates the number of vehicles stopped at the intersection and approaching the intersection. These estimates can be based on historical turning percentages or estimated turning percentages. The method also can estimate the occupancy for each approach of the intersection. Based on this occupancy, the method can determine whether or not the intersection is congested. If it is not congested, the signal control for traffic at the intersection can be determined using a set of rules. For congested intersections signal control logic creates a fixed time plan for the intersection.

The above and still further objects, features and advantages of the present invention will become apparent upon consideration of the following descriptions and descriptive features of specific embodiments thereof. While these descriptions go into specific details of various embodiments of the invention, it should be understood that variations may and do exist and would be apparent to those skilled in the art based on the descriptions herein.

DESCRIPTION OF THE PREFERRED EMBODIMENTS

Figure 1:
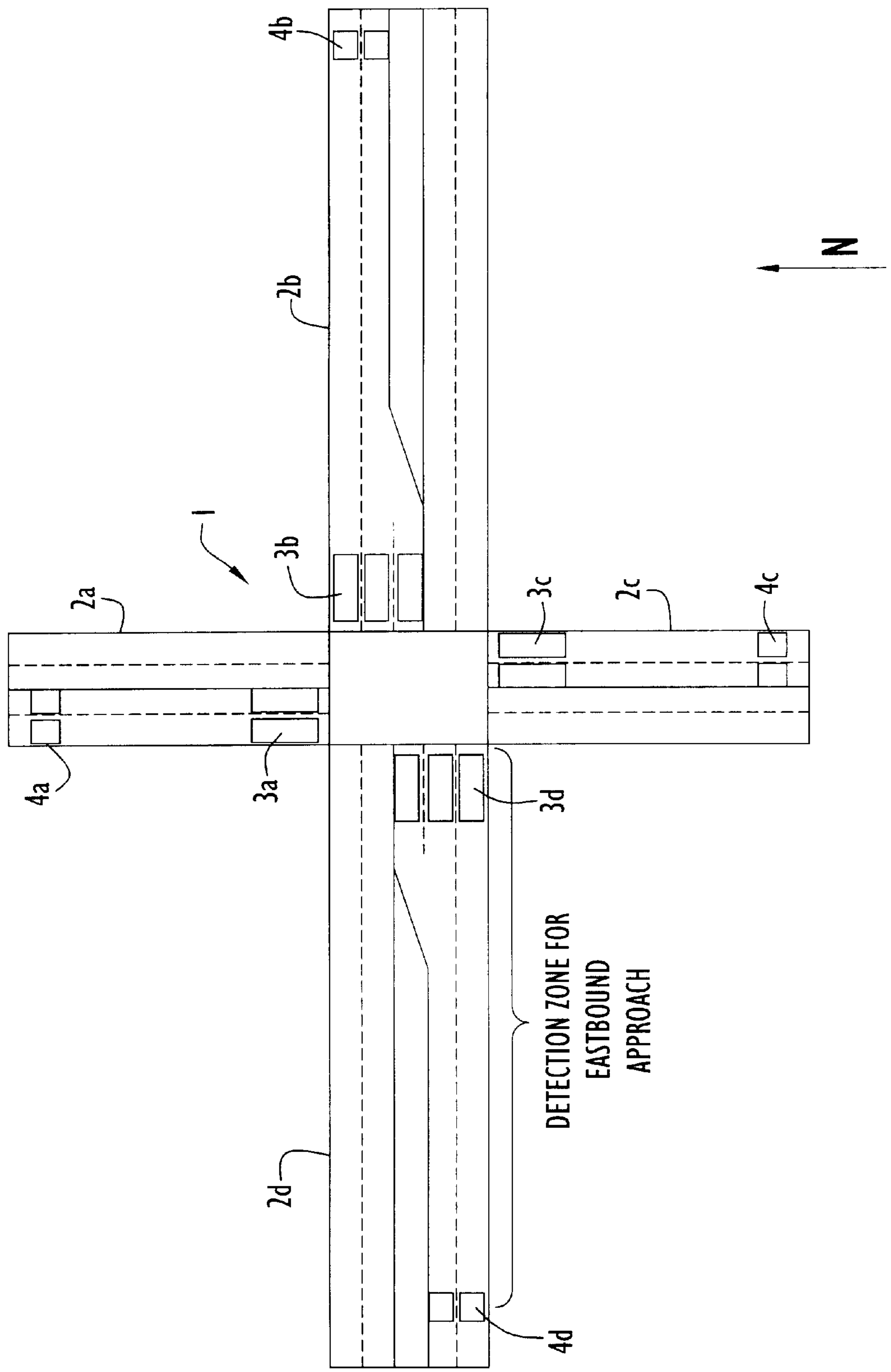
FIG. 1 is a diagram of a conventional intersection employing upstream and stop bar detectors.

Preferred embodiments according to the present invention are described below with reference to the above drawings, in which like reference numerals designate like components.

FIG. 1 shows a typical intersection 1 with four approaches to the intersection. Each approach consists of a number of lanes 2*a–d*. Detectors are located at each of the lanes and vehicles that are in the lanes progress towards the intersection. In the intersection 1 shown in FIG. 1 upstream detectors 4*a–d* are located ahead of the intersection in the lanes with traffic approaching the intersection. Here, stop bar detectors 3*a–d* are located at the stop bar in each lane approaching the intersection. The distance between a lane's upstream detector 4 and its stop bar detector 3 is referred to here as the detection zone for that lane.

Figure 2:
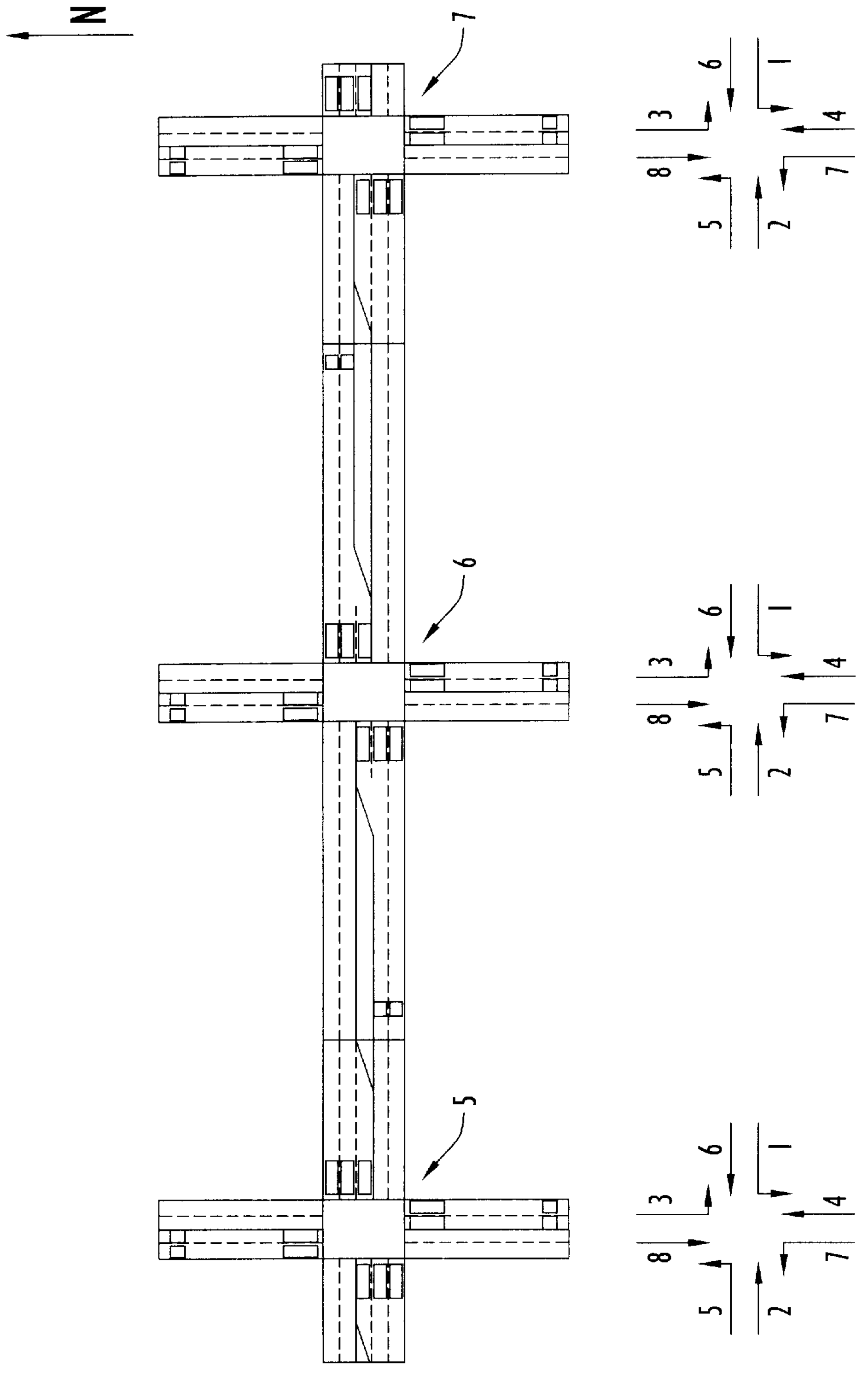
FIG. 2 is a diagram showing three adjacent intersections and showing the NEMA (National Electric Manufactures Association) movement codes for those intersections.

The various types of approaches to an intersection are designated with movement codes according to the National Electric Manufacturer's Association (NEMA). The movement codes for three adjacent intersections 5, 6, and 7 are shown in FIG. 2. The movement codes, also referred to a movement phases, describe the allowed traffic patterns in an intersection. For example, a combination of NEMA codes 4 and 8 services the cross street at an intersection and refers to traffic travelling north and south. This combination is referred to as a (4,8) phase. The (2,6) phase in FIG. 2 services the main street and refers to traffic travelling east and west, respectively. A (2,5) phase refers to traffic in the eastbound lane both turning left and travelling straight through the intersection.

Overview

There are three basic elements to a generalized adaptive signal control algorithm project, referred to here as the "GASCAP" process. The first element is a sophisticated queue estimation method, the second, a basic set of rules for uncongested conditions that use the queue estimates to determine the signal state at an intersection, and the third, a method that computes splits, offsets, and cyclelengths if the intersection is congested. Here, an intersection is considered to be experiencing congestion if the occupancy of upstream detectors on its opposing approaches (e.g. northbound and eastbound) is larger than 0.5. The occupancy of a detector refers to the amount of time the detector is on divided by the total time of observation. Typically this occupancy is computed over a 15-minute interval.

The detector requirements for the GASCAP process are relatively minimal, in that each approach should have a set of upstream detectors, one for each lane. For certain approaches (i.e. an approach from a parking lot) this requirement can be reduced to detectors at the stop bar only. The GASCAP process uses the information from those upstream detectors to estimate the turning percentages at the intersection and the number of vehicles in queue and approaching the intersection.

Figure 3:
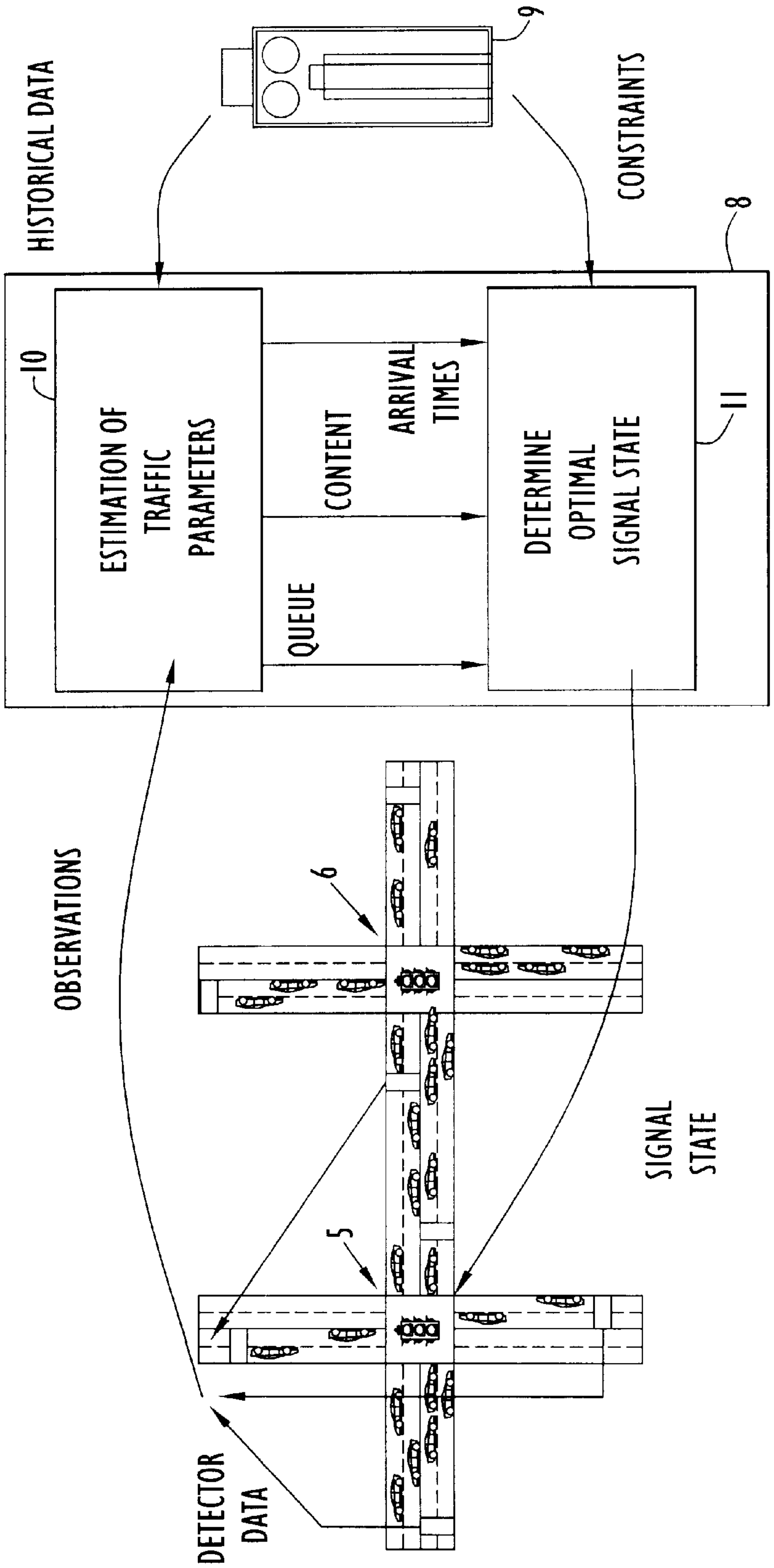
FIG. 3 is a conceptual diagram illustrating adaptive signal control using traffic estimation and signal state determination according to the invention.

The GASCAP process operates as shown conceptually in FIG. 3. Detector data is collected by the detectors and input to a local traffic controller 8. The traffic controller 8 includes a board with an embedded processor on which the GASCAP process runs. The traffic controller 8 is connected through a network to a central computer 9 that provides historical traffic data, such as turning percentages, and constraints on operating the traffic signal. The GASCAP process takes the real-time detector data, as well as the historical data from the central computer 9, and estimates, in the block labeled 10, queue lengths, or number of vehicles waiting in a lane at the intersection, the content. The queue length refers to the number of vehicles in the lane that are waiting at the traffic signal. Queue length estimates are based on the activations of the upstream detectors. The content of a lane refers to the number of non-queued vehicles between the stop bar and the upstream detector, and is based on a combination of detector activations, queue estimates and saturation flow rates. This estimated traffic parameter information is used in the block labeled 11 to determine the optimal signal state based on the real-time traffic conditions.

Traffic Controller

Figure 4:
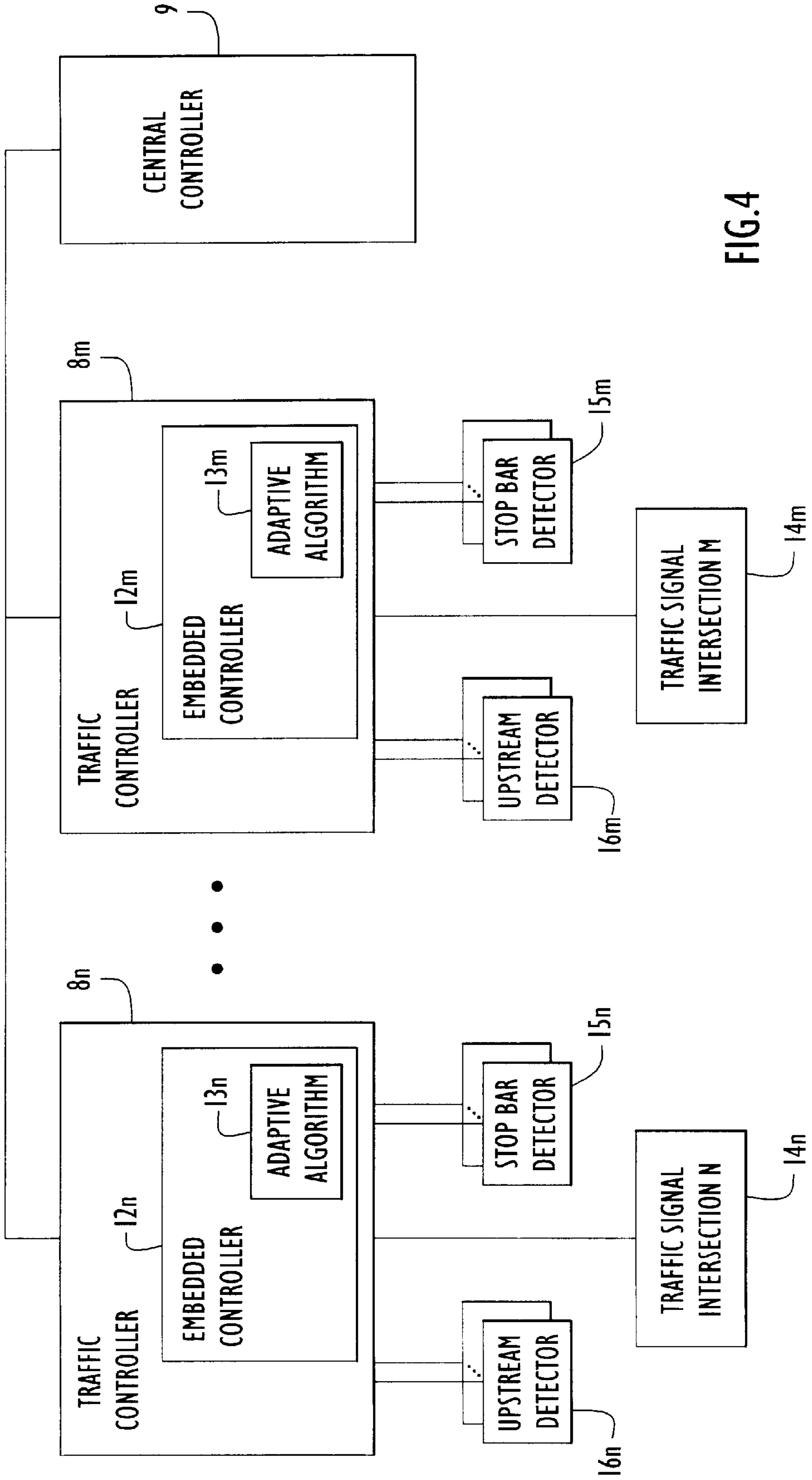
FIG. 4 is block diagram of traffic controllers and a central controller according to an aspect of the invention.

A number of the traffic controllers 8*n* through 8*m* can be connected to one another through peer to peer communication, and to the central computer 9, as shown in FIG. 4. The system shown in FIG. 4 is but one example of a system that can employ the GASCAP process, and it serves to illustrate the invention. The traffic controllers 8*n* through 8*m* can be, for example, existing model 170 controller units. In this case the traffic controller 8*n* includes an embedded controller 12*n* that runs the GASCAP adaptive method 13*n*. The embedded controller can be, for example, an INTEL 386 class processor board for use in an embedded application. Alternatively, the traffic controllers 8*n* through 8*m* can be more advanced traffic controllers, such as the model 2070 controller unit. The traffic controller 8*n* controls a traffic signal 14*n* at an intersection N. Data from the upstream detectors 16*n* and stop bar detectors 15*n* are supplied to the traffic controller 8*n*.

The traffic controller 8*n* is connected to a central controller 9 via a network, using, for example, fiber optic connections. The traffic controller 8*n* also can be connected to adjacent traffic controllers, such as traffic controller 8*m* or an intermediate traffic controller, which includes similar components 12*m* through 16*m*, as described above with respect to intersection N.

Queue Estimation

There are three basic responsibilities of the queue estimation method used in the GASCAP process. The first is to predict the number of vehicles in queue and also the content of vehicles for each lane of an approach. Within this context, the content is the total number of vehicles approaching an intersection but not in queue, where a vehicle is in queue if it is stopped at an intersection. The second responsibility is to analyze the gaps of opposing vehicles for permitted left turners. For example, if a vehicle is traveling on the northbound approach and preparing to turn left (westbound) the vehicles proceeding southbound would be the vehicles that oppose the vehicle making the turning movement. If the gaps between those southbound vehicles are large enough, the turning vehicle will be able to complete the movement. The third responsibility is to estimate the turning percentages for each approach.

If all the lanes are not covered with stop bar detectors then the GASCAP process will not be able to perform a gap analysis to determine when vehicles making a permitted left turn can complete their movement and be removed from the queue. In this case, GASCAP uses the constant saturation flow rates specified in input files that are used for initialization to establish the data structures shown in FIG. 7, to estimate when a vehicle will be able to complete a permitted left turn. If deployed in the field, a central computer could initialize GASCAP by sending a series of messages that would be used to populate the data structures.

Finally, the turning percentages for the movements on an approach are estimated. If the upstream detectors are not placed near the upstream intersection of a particular approach then estimating these percentages may not be possible, and the GASCAP can rely on historical turning data.

Figure 5:
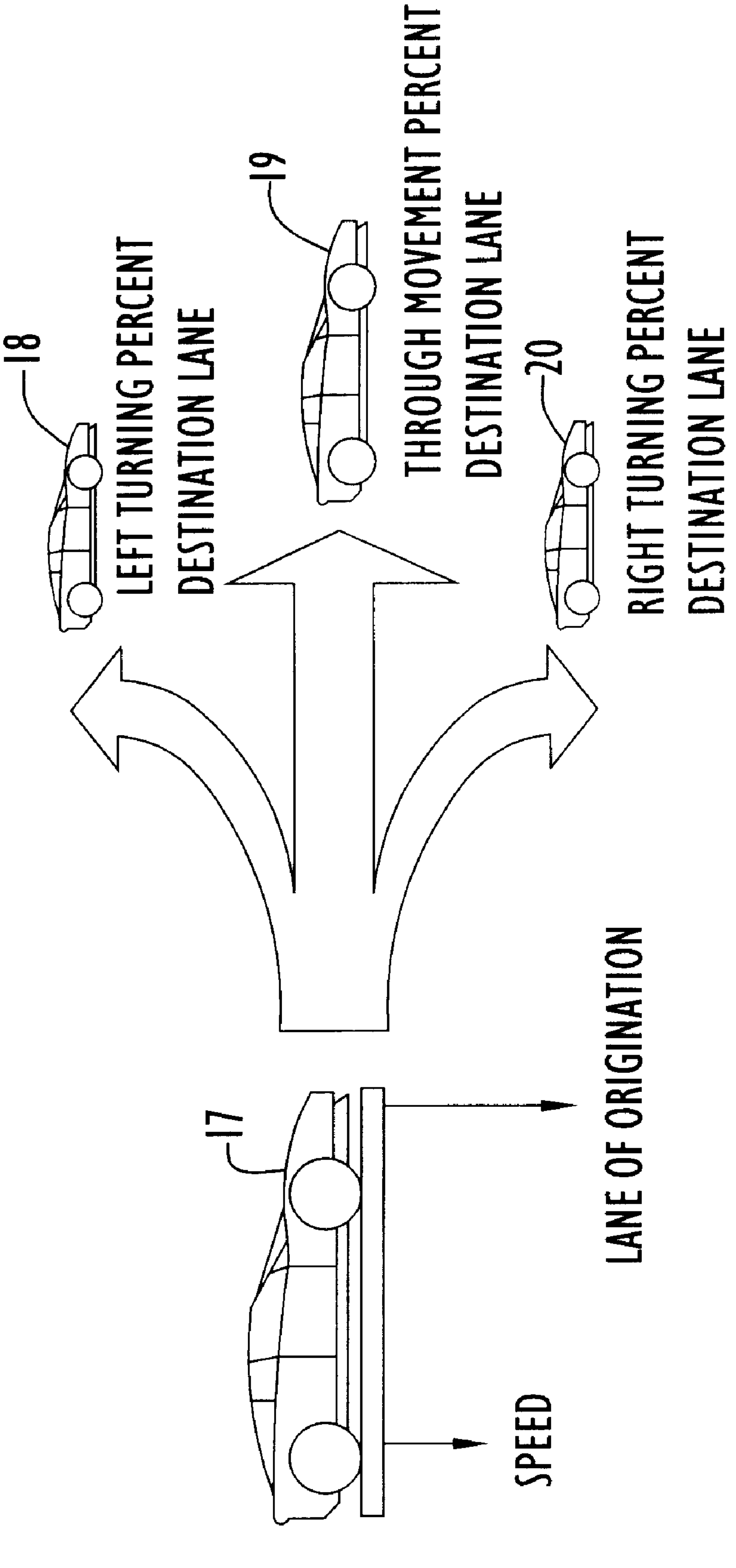
FIG. 5 is a conceptual diagram showing how the present invention designates a vehicle entering a detection zone as three partial vehicles according to possible movements of the vehicle in the zone.

To estimate the number of vehicles in queue, GASCAP records the number of detector activations from the detectors upstream of the intersection. When an activation occurs the method creates a "partial" vehicle for each possible movement allowed on that approach. This is illustrated in FIG. 5. A vehicle 17 is characterized by its speed and the lane in which it approaches the intersection, that is, its lane of origin. Each of the partial vehicles created is assigned a weight based on the turning percent for that movement. For example, assume the left, through and right movements are supported on a particular approach. Let the left turning percentage be 20, the through movement percent 60, and the right turn percent is 20. The GASCAP process creates 3"partial" vehicles, one for the left movement 18 with a weight of 0.2, one for the through movement 19 with weight of 0.6, and one for the right movement 20 with weight of 0.2. The GASCAP process will also estimate the speed for each of the vehicles using the detector activation time and the assumption that each vehicle is a fixed length (e.g., 15–20 feet). Each of the vehicles will be assigned a destination lane based on the allowed movements for each lane and the length of the queue in each lane. For example, if there are 3 lanes for the through movement, the destination lane will be the one with the shortest queue length.

The queue estimation method is called every second. At each second the method determines if any of the "partial" vehicles that were created from the detector activations will arrive in queue. The arrival in queue is determined by considering the expected speed profile. This profile is a function of the vehicle's initial speed, queue length for the destination lane, and free flow speed on the link. Free flow speed refers to the speed at which drivers are comfortable traveling. For example, the speed limit may be 35, but most people will go 40–45 mph, and hence, the free flow speed is 40–45 mph. A link is a group of lanes serving one approach (southbound), at an intersection. The method to generate this speed profile is divided into two parts. Each part assumes a constant acceleration ac, which is in the range of 8.0 to 12.0 ft/s$^2$. The first part of the method is executed if the estimate for the vehicle's initial speed, $V_D$, is greater than FFS, where FFS denotes the free flow speed on the link.

The first part of the speed profile generation method, according to one embodiment of the invention, is described as follows:

1. Compute the "normal stopping distance" as defined by Yang, Q., Koutsopoulos, H. N., *Transportation Research C,* "A Microscopic Traffic Simulator for Evaluation of Dynamic Traffic Management Systems," vol. 4, p. 113, 1996, using equation 1 below.

$$d_{Stop}=V_d^2/(2a_c) \quad \text{Eq. 1}$$

2. If this stopping distance is smaller than the distance to the back of queue then compute the time to queue using equations 2 and 3 below. Here, $d_{BOQ}$ is the distance to the back of the queue from the upstream detector.

$$d_{cruising}=d_{BOQ}-d_{Stop} \quad \text{Eq. 2}$$

$$t_{queue} = \frac{d_{cruising}}{V_d} + \frac{V_d}{a_c} \quad \text{Eq. 3}$$

3. If the "normal stopping distance" is larger than the distance to the back of queue then the time to queue is computed from $$t_{queue} = 2\frac{d_{Stop}}{V_d} \quad \text{Eq. 4}$$

The second part of the method is executed if $V_D$<FFS.

The second part of the speed profile generation method, according to one embodiment of the invention, is described as follows:

1. Compute the "normal stopping distance" as defined by Yang using equation 5 below.

$$d_{Stop}=V_d^2/(2a_c) \quad \text{Eq. 5}$$

2. If $d_{Stop}<d_{BOQ}$ then there is room to accelerate to a greater speed. Compute the maximum possible speed using the following equations 6, 7 and 8.

$$x=8a_c^2V_d^2+16a_c^3d_{BOQ} \quad \text{Eq. 6}$$

$$t_{\max} = -\frac{V_d}{a_c} + \frac{1}{4a_c^2}\sqrt{x} \quad \text{Eq. 7}$$

$$V_{max}=\max(V_d+t_{max}a_c, FFS) \quad \text{Eq. 8}$$

3. Compute the time to queue from the equations 9 through 15 below.

$$t_{accelerate} = \frac{V_{\max} - V_D}{a_c} \quad \text{Eq. 9}$$

$$d_{accelerate} = V_D t_{accelerate} + \frac{1}{2}a_c t_{accelerate}^2 \quad \text{Eq. 10}$$

$$t_{decelerate} = \frac{V_{\max}}{a_c} \quad \text{Eq. 11}$$

-continued $$d_{deceleration} = \frac{V_{\max}^2}{2a_c} \quad \text{Eq. 12}$$

$$d_{cruise}=\max(d_{BOQ}-d_{acceleration}-d_{deceleration}, 0) \quad \text{Eq. 13}$$

$$t_{cruise} = \frac{d_{cruise}}{V_{\max}} \quad \text{Eq. 14}$$

$$t_{queue}=t_{accelerate}+t_{cruise}+t_{decelerate} \quad \text{Eq. 15}$$

4. If $d_{Stop}>d_{BOQ}$ then there is no room to accelerate and the vehicle must stop now. The time to queue is given by equation 16, below.

$$t_{queue} = \frac{2d_{Stop}}{V_d} \quad \text{Eq. 16}$$

The queue estimation method also computes when a vehicle that is in queue will depart from the queue. The time to exit the queue is a function of the position of the vehicle in the queue, the saturation flow rate, and the start up loss time. An example of computing the exit time is shown below in equation 17.

$$t_{exit} = t_{current} + t_{lossTime} + \frac{3600}{SFR}n_{queue}f_{contributin}, \quad \text{Eq. 17}$$

where $t_{current}$ is the current time, $t_{lossTime}$ is the start up loss time, SFR is the saturation flow rate (vehicles/hour), $n_{queue}$ is the vehicle's position in queue, and $f_{contribution}$ is the weight assigned to the vehicle based on its movement. If the vehicle has not arrived in queue and there is a queue, then the time at which the vehicle will arrive in queue is computed. If there is no queue on the link then the time the vehicle will exit the link is computed, assuming the vehicle will accelerate until it has reached its free flow speed, as shown by the following method. Once again a constant acceleration $a_c$ is assumed, which is in the range of 8.0 to 12.0 ft/s$^2$ and an initial velocity $V_D$.

A. If $V_D$>FFS then the time to exit is computed according to equation 18.

$$t_{exit} = \frac{d_{stop}}{V_D} \quad \text{Eq. 18}$$

B. If $V_D$<FFS then the time to exit can be computed from equations 19–23 below.

$$t_{FFS} = \frac{FFS - V_D}{a_c} \quad \text{Eq. 19}$$

$$d_{acceleration} = V_D t_{FFS} + \frac{a_c}{2t_{FFS}^2} \quad \text{Eq. 20}$$

$$d_{cruise}=\max(d_{Stop}-d_{acceleration}, 0) \quad \text{Eq. 21}$$

$$t_{cruise}=\frac{d_{cruise}}{V_D} \quad \text{Eq. 22}$$

$$t_{exit}=t_{FFS}+t_{cruise} \quad \text{Eq. 23}$$

The second part of the queue estimation method analyzes the activations of the detectors at the stop bar detectors on the opposing approach to determine when a "partial" vehicle that is attempting a permitted movement has exited the queue. Typically, the gaps, measured between the times of arrival of corresponding parts (e.g. front bumpers) of successive vehicles, between detector activations are analyzed to determine if a vehicle has had enough time to complete its movement. If so, the vehicle is no longer counted as in queue on that approach.

The third part of the queue estimation method approximates the turning percentages for a particular approach. A rough estimate for the turning percentages can be computed if the activations from the upstream detectors on an approach to an intersection are correlated with the activations from detectors on the exit links of the intersection. The exit link detectors are placed directly downstream of the intersection and detect the vehicles immediately after they exit the intersection. To accomplish this GASCAP counts the number of vehicles that have arrived at an intersection since the start of green and compares this number with the number of detector activations at a downstream detector. An upstream detector for the next intersection can be used in place of a downstream detector in some instances. Upstream detectors generally are placed no more than 600–700 feet upstream of the intersection. If the link is longer than 700 feet downstream, detectors would be placed at the start of the link. An important constituent of the method is determining the window of times for which the downstream activations should be examined. If the window is too large the percentage for vehicles going through the intersection will include vehicles that were not in queue at the upstream intersection but are from other sources. Thus, the estimate will be too high. If the window is to small the method will not include enough of the vehicles from the upstream intersection and the estimates will be too low. However, it is not difficult, and it will be understood how to compute the beginning and ending of this window using the travel time and the amount of time it will take to discharge the vehicles in queue at the upstream intersection.

GASCAP Rules for Uncongested Intersections

The queue and content estimates that have been computed for each lane are translated into a queue and content for a particular movement. This movement is generally a pair of protected movement codes. For example, the NEMA movement code (1,6) would correspond to the protected movement for left and through vehicles. The rules in GASCAP for uncongested intersections are organized around the (1–8) NEMA movement codes shown in FIG. 2. The number of vehicles that are in queue and content requesting a certain movement are computed every second, and a set of rules uses that information to determine the signal-state at the intersection.

Figure 6:
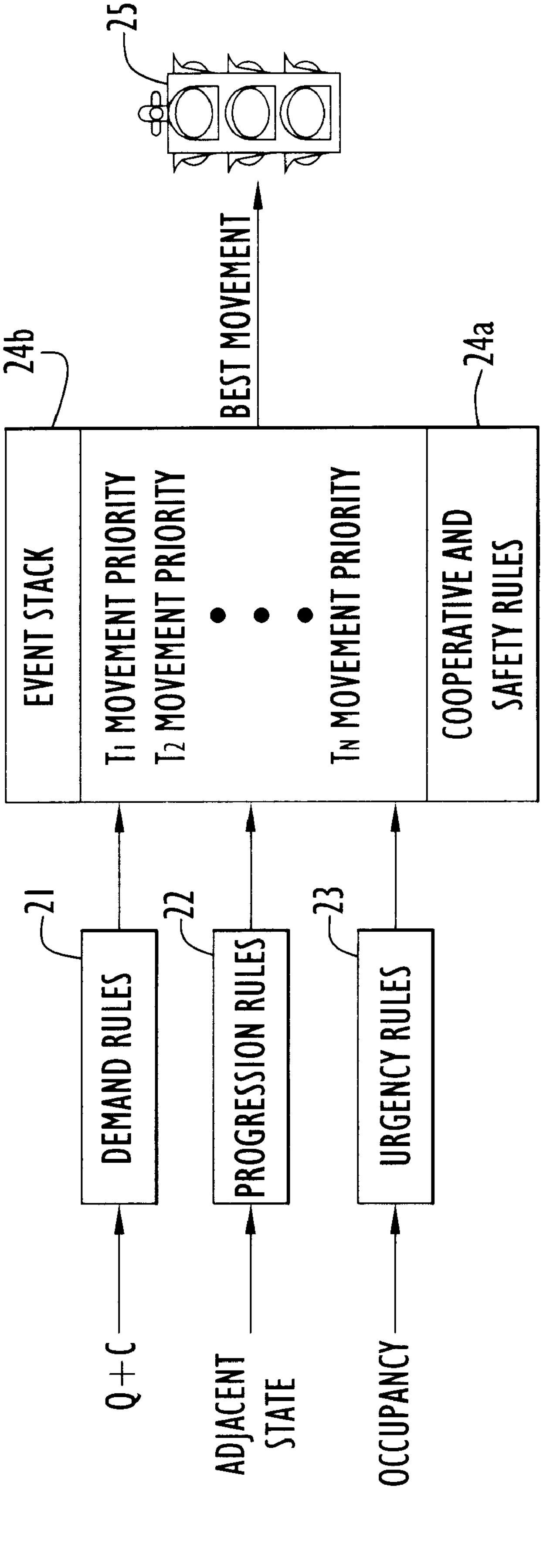
FIG. 6 is a diagram showing rules used in the present invention to control a traffic signal.

The rules for uncongested control within GASCAP can be categorized into four different sets as shown in FIG. 6: demand rules 21, progression rules 22, urgency rules 23 and cooperation rules 24*a*. A fifth set of rules, safety rules, is inherent in the other four sets of rules, and is not shown in FIG. 6. Input to the demand rules 21 is queue and content estimates; to the progression rules 22, state information from adjacent intersections; and to the urgency rules 23, occupancy information. Each set of rules submits its recommended movement to an event list 24*b*. Each movement is assigned a priority level (e.g., "T1 Movement Priority," etc.), and the GASCAP process selects the movement with the highest priority for the current movement at the intersection, for controlling the traffic signal 25, consistent with the cooperation and safety rules 24*a*. The priority for the movements is based on the estimated number of vehicles that will request that particular movement.

Each of the sets of rules is described below.

Demand Rules

The first category of rules is called the demand rules. This set of rules uses the queue and content information for each of the NEMA movements and selects the one with the greatest need. To begin with, the demand rules determine if the queue for the current movement is below a constant threshold. This threshold is defined as the number of vehicles that are able to pass through the intersection during the clearance interval for the current phase. A clearance interval is the time allotted for vehicles in the intersection to clear the intersection. Specifically, it is the yellow and all red phases that follow a particular movement. If the queue is less than the threshold, the method determines if it should change to another NEMA phase by comparing the queue for the other movements with the content for the current movement. If the queue for a different movement is larger than the current movement's content, then the demand rules will select the movement with the largest queue. If the queue for the current movement is greater than the constant threshold, the method may still determine it is necessary to change to another NEMA phase. For example, if there are no more left turners associated with the current movement then the demand rules will once again select the movement with the largest queue. The priority for the movement recommended by the demand rules is the sum of the estimated queue and content for that NEMA phase, and is independent of any phase sequence.

Progression Rules

Of course, most networks that have serious traffic problems are rarely composed of only isolated intersections. For most networks the progression of vehicles from intersection to intersection must be considered, and an effective adaptive control strategy should coordinate green times at adjacent intersections. To accommodate this, the GASCAP process contains a set of rules called the progression rules. This category of rules allows adjacent nodes, or intersections, to be coordinated.

Whenever an adjacent intersection changes to a NEMA phase that will supply vehicles to a downstream node, the downstream node will schedule up to three NEMA phases to coordinate with the upstream intersection. For example, consider the middle intersection N of the network shown in FIG. 2. Assume the (1,6) NEMA phase is the movement that serves vehicles moving from right to left. If intersection N-1 changes to the NEMA phase (2,6) at time=0 and the travel time from intersection N-1 to intersection N is T, then the progression rules at intersection N will schedule a (2,6), (1,6), and (1,5) movements at time+T.

Now denote the content of vehicles at intersection N-1 that will approach intersection N by the variable C, and the percent of vehicles that will go through intersection N by the variable TH, and the percent of left turners by L. Then the priority for the scheduled movement (2,6) will be C*TH, the priority for the (1,5) movement will be C*L, and the priority for the (1,6) movement will be C.

Urgency Rules

As traffic demand increases and conditions approach saturation, another set of rules called the urgency rules are required. The urgency rules search the upstream detectors on all approaches into a node to determine if any of them have been on continuously for 15 seconds. If this is true for some of the detectors on a particular approach, the urgency rules determine which detector has been on the longest and submits the NEMA phase that will serve that approach. In one embodiment of the invention it can be assumed that the approach is not blocked. In addition, the urgency rules determine how long it would take to empty a queue backed up to the detectors and continually submit the same recommendation for this period of time. The priority for the NEMA phase the urgency rules recommends is equal to the maximum number of vehicles that might be in queue on the approach.

Cooperative Rules

When traffic conditions begin to move from saturated to congested, it is necessary to consider the conditions downstream of an approach. The cooperative rules allow upstream intersections to cooperate with their downstream neighbors. For example, if the approach between two nodes is experiencing spillback, where an approach on a downstream node is so congested no more vehicles can be added to the approach, then the upstream node will not select a movement that will contribute to this spillback. Instead, the upstream intersection will choose the movement with the largest queue that does not contribute to the spillback.

The Safety Rules

Inherent in these rules for uncongested control are a set rules called the safety rules. The safety rules prevent the process from setting the signal state to an unsafe state. This classification of rules operates independently of the others. These safety rules are summarized below.

Always use the appropriate duration for clearance intervals.

Never implement a signal state with conflicting phases (i.e. (1,2) is not allowed).

Use the permitted settings specified in the input files, or specified in initialization messages sent from a central computer, for left turners.

A phase must not be terminated until it has been serviced for the minimum green time.

Selecting the Appropriate Movement from the Event List

As mentioned above, each set of rules submits a recommendation for the next movement to an event list. The GASCAP process analyzes each of these recommendations and typically chooses the one with highest priority. However, before this can occur some of the movements on this event list will need to be updated to reflect current traffic conditions. Generally, a movement on the list must be updated under two conditions. The first condition involves movements recommended by the progression rules. Recall, that these movements were placed on the event list to be implemented in the future. Since the queue length at the intersection for this future time was not known, the GASCAP process must update the priorities of these movements by adding the now known queue to the priority. For example, let $P_{new}$ be the variable that represents the new priority, $P_{old}$ be the previously assigned priority, and the queue associated with the movements described above be denoted by the variable Q. When the current time is equal to the implementation time for the movement, the priority of the movement will be updated according to the following equation $P_{new}=P_{old}+Q$.

The GASCAP process will also update the priority of movements on the event list to reflect the spillback conditions on upstream links. For example, if the approach with upstream node N-1 and downstream node N, is experiencing spillback then the cooperative rules will prevent the node N-1 from selecting a movement that will contribute to this spillback. Consequently, the GASCAP process will select the movement on its event list that has the next highest priority. Now the movements on node N's event list must be updated to reflect the fact that node N-1 was not able to select its desired movement (i.e. the one with the highest priority), because of the spillback at node N. In this particular example, if movements (1,6) or (2,6) are on the event list for node N then the queue that would approach node N from node N-1 will be added to priorities for these movements. This will be repeated for other upstream nodes if the spillback at node N is preventing those nodes from selecting a movement that would contribute to the spillback downstream.

After the event list for a node is updated, the movement with the highest priority will be chosen. However, if the stop bar detectors for this movement dictate that a more intelligent movement would be appropriate, then that more intelligent movement is the movement selected. For example, if the (1,6) movement has the highest priority, but the stop bar detectors for the left turners are not activated, the method will select the (2,6) movement.

The uncongested control within the GASCAP process is strongly dependent on the estimates of the queue on a particular approach. However, as traffic conditions reach the congested level, it is more difficult to estimate the queues for each movement. Consequently, this type of control is not feasible, it is therefore necessary to have a different control strategy when an intersection is congested.

GASCAP for Congested Intersections

For intersections that are experiencing congestion, GASCAP uses information from the upstream detectors to construct a fixed-time signal plan. The activations and deactivations at the upstream detectors are used to compute the occupancy for the approaches to the intersection over a 10–15 minute period. From the occupancy the volumes are computed. GASCAP creates a timing plan for the congested intersection based on those volumes. This timing plan has a fixed cycle-length and is updated every other cycle-length. Essentially, the GASCAP process adjusts the splits and offsets for the intersection based on previous volumes, dividing the green time equitably among the different movements. If the occupancy for the approaches at the upstream adjacent intersections is greater than 0.5, then their volumes are also considered when the splits for the fixed timing plan are computed. The cyclelength is computed from the available storage space at the downstream intersections.

Data Structures

Figure 7:
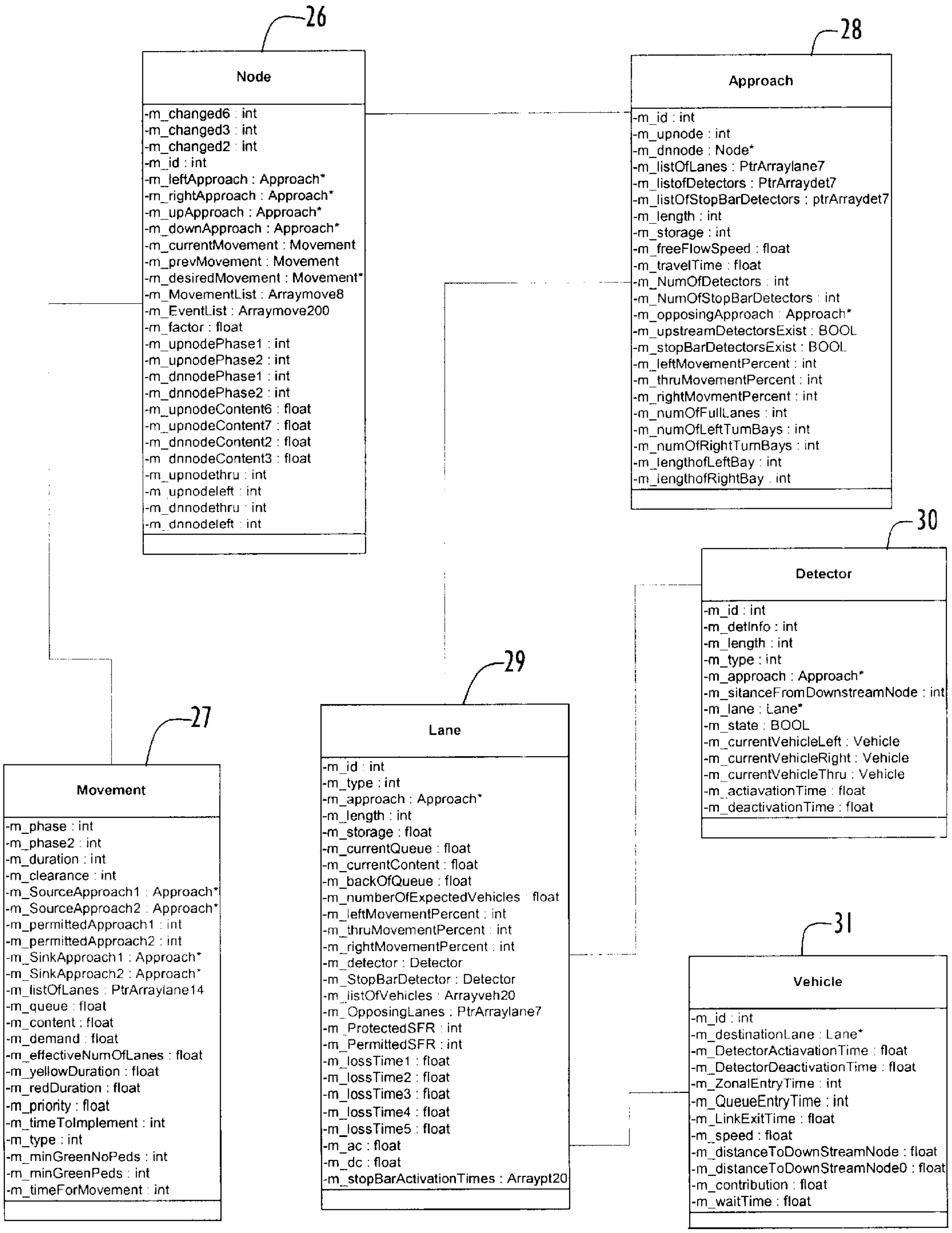
FIG. 7 shows various data structures according to the invention for representing aspects of an intersection.

An intersection and its associated entities, such as the lanes, detectors and vehicles approaching the intersection, are represented by data structures for processing by the GASCAP process. Example data structures that can be used in an adaptive traffic control system according to the invention are shown in FIG. 7. That diagram shows the data structures for an intersection, or node 26, a movement 27, an approach 28, a lane 29, a detector 30, and vehicle 31. Each data structure in FIG. 7 shows data elements, with descriptive names, and their data type (e.g., m_upnodePhase1 is an integer data type).

The node data structure 26 includes as data elements several approaches, one for each direction that feeds into the intersection. It also includes different movements that are associated with the node. The movements correspond to the different NEMA movement codes shown in FIG. 2.

The movement data structure 27 allows different combinations of approaching vehicles to be serviced through the intersection.

An approach to the intersection is represented by an approach data structure 28, and includes data elements concerning the approach.

Several lane structures 29 are associated with an approach, because an approach will consist of several lanes. Several detectors 30 (an upstream detector and a stop bar detector, as shown in FIG. 1) are associated with a lane. In addition, several vehicle data structures 31 will be associated with each lane.

Operation of the GASCAP Process

Figure 8:
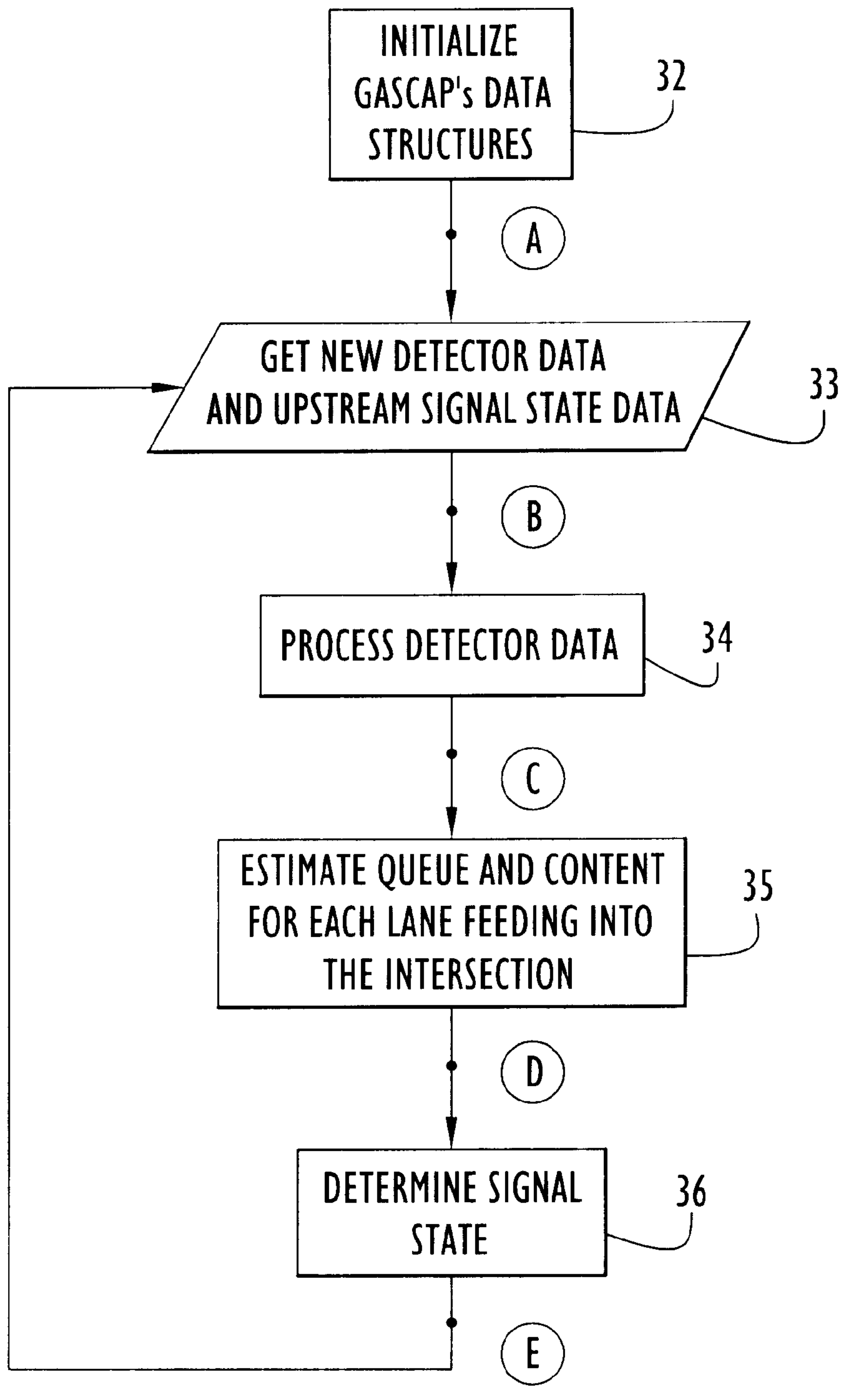
FIG. 8 is a flowchart showing the overall adaptive signal control process according to the invention.

Referring to FIG. 8, the overall method of performing the GASCAP process will be described. In operation 32 the method's data structures, such as those shown in FIG. 7, are initialized. In operation 33 detector data and signal state data from the upstream intersections is received, processed by the method and stored in the data structures, such as those shown in FIG. 7. Next, in operation 34 the method processes the detector data including computing the number of vehicles in queue and the number of vehicles approaching the intersection. These numbers are transformed, in operation 35, into the queue and content information for each particular movement that is allowed at the intersection (see FIG. 2 for the allowed NEMA code movements). The method then, in operation 36, determines the near optimal signal-state for the intersection using a set of rules.

Figure 9:
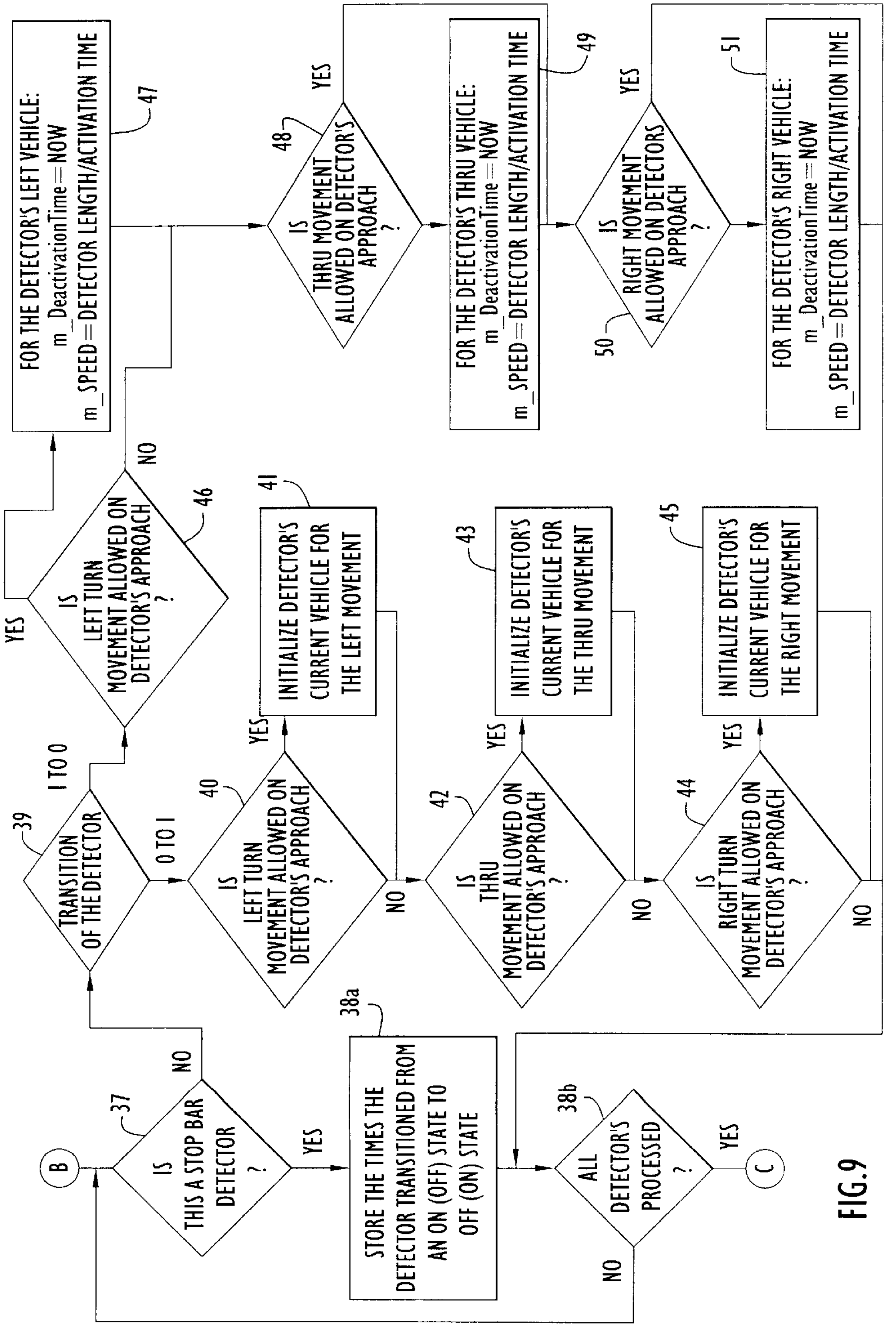
FIG. 9 is a flowchart for processing detector data according to an aspect of the invention.

Operation 34, for processing the detector data, will be described in greater detail with reference to the flowchart shown in FIG. 9. If the detector is at the stop bar, as indicated in operation 37, then the method stores the activation or deactivation times that have occurred for the current second (operation 38*a*), and returns to point "C" in the flowchart if all the detectors have been processed (operation 38*b*). Otherwise, flow returns to operation 37.

The processing for upstream detectors is more complicated. If the detector being processed is not a stop bar detector (operation 37), then the process flows to operation 39 where it is determined if the detector has transitioned. Up to three partial vehicles (one for left turn movement, one for through movement, and one for right turn movement) are associated with each upstream detector. When a detector is activated (e.g., transitioning from an off state to an on state), the method determines if a left turn movement (operation 40), a through movement (operation 42) or a right turn movement is allowed on the detector's approach. If a detector is activated, the process initializes these partial vehicles in operation 41 for a left turn movement, in operation 43 for a through movement, and in operation 45 for a right turn movement. Initialization for these three vehicles includes setting the following variables, which are defined in the data dictionary an example of which is set forth in the Appendix.

m__id
m__waitTime
m—DetectorActivationTime
m__ZonalEntryTime
m__distanceToDownStreamNode
m__destinationLane
m__contribution Once the three partial vehicles are initialized flow returns to operation 38*b* to determine if all the detectors have been processed.

If, in operation 39, it is determined that the detector has been deactivated (transitioning from an on state to an off state) indicating that a vehicle has completed passing over the detector, then this deactivation time is recorded. In operation 46 if a left turn movement is allowed on the detector's approach, then in operation 47 the deactivation time and an estimate of the vehicle's speed is recorded for the partial vehicle corresponding to a left turn movement (referred to hereinafter as a left turn movement). The speed estimate is computed using the known length of the detector and the amount of time the detector was on. Also, the m__ZonalEntryTime for the vehicle is set to the current time. Similar information is recorded for a through vehicle (operations 48 and 49), and a right turning vehicle (operations 50 and 51).

The process then flows to operation 38*b* to determine if all detectors have been processed. If so, flow returns to the point labeled "C" so that operation 35 shown in FIG. 8 can be performed.

Figure 10:
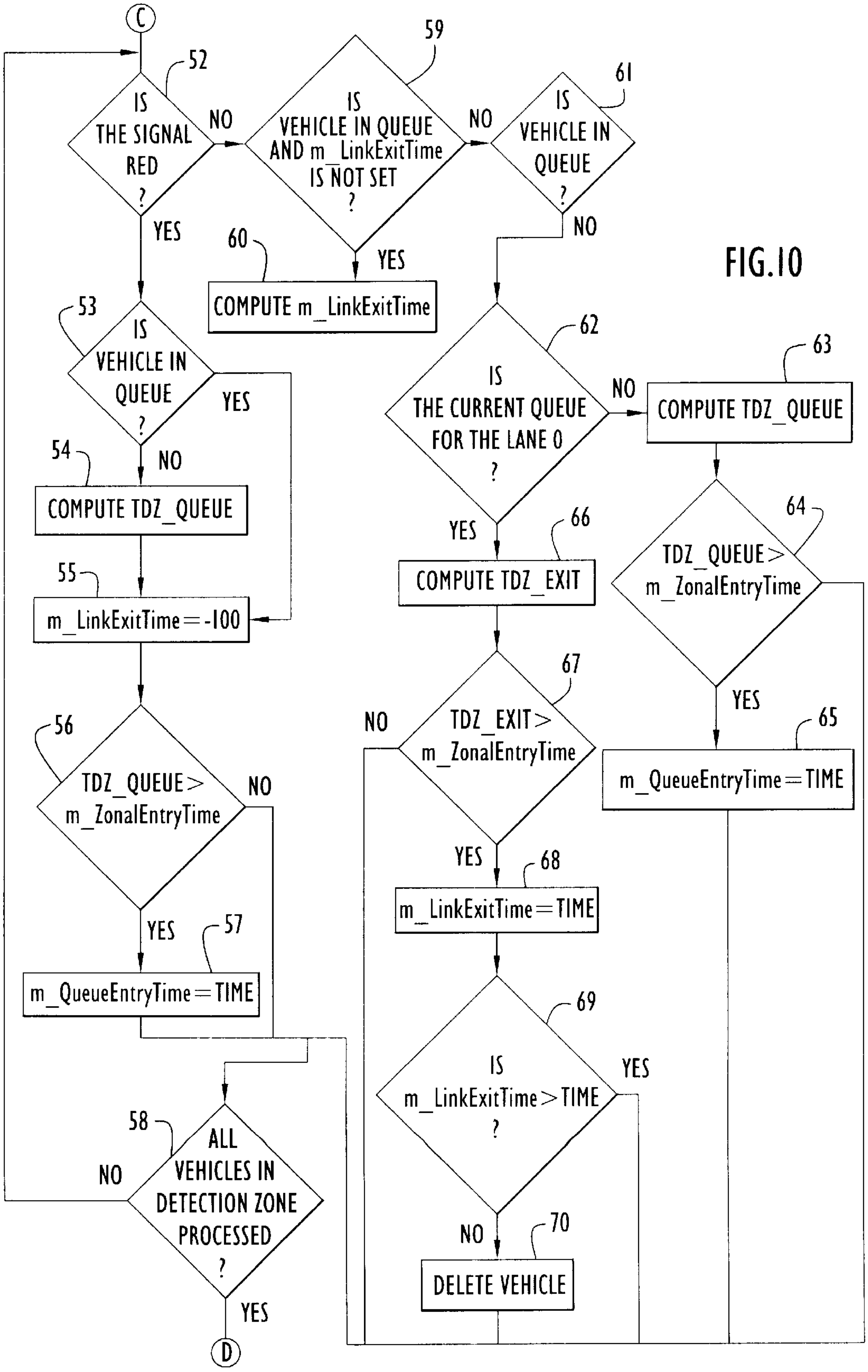
FIG. 10 is a flowchart illustrating queue estimation according to an aspect of the invention.

FIG. 10 shows in detail the process of operation 35 for estimating the queue and content for each lane approaching the intersection. This process is executed for every vehicle that enters the detection zone, which can be detected by an upstream detector being activated. If the process determines that the vehicle is approaching a red signal (operation 52) and the vehicle has arrived in queue (operation 53) then the vehicle is not ready to exit the intersection, so the vehicle parameter m__LinkExitTime is set to a predetermined value, such as −100, for example (operation 55). If the vehicle is not yet in queue then the process computes the time (TDZ__QUEUE) at which the vehicle must have entered the detection zone to be in queue at the current time (operation 54). More specifically, TDZ__Queue=current time$-t_{queue}$ The $t_{queue}$ is the amount of time it takes the vehicle to arrive in queue with the current queue length. The current time$-t_{queue}$ is the time the vehicle must have entered the detection zone.

If this time (TDZ__QUEUE) is greater than the actual time the vehicle entered the detection zone (m__ZonalEntryTime) (operation 56), then the process determines that the vehicle has arrived in queue at the current time, and sets the vehicle parameter (m__QueueEntryTime) equal to the current time (operation 57). The process then detects if all vehicles in the detection zone have been processed, and if not, returns to operation 52 (operation 58). Is so, the process flows to the point labeled "D" in FIGS. 8 and 10.

If the signal is not red and the vehicle is in queue, but its exit time (m__LinkExitTime) has not been set (operation 59), then the process computes the time it will exit the intersection (operation 60). If the vehicle is not in queue (operation 61) and there is no queue in the lane (operation 62) then the process computes the time (TDZ__EXIT) at which the vehicle must have entered the detection zone if it were to exit at the current time (operation 66). More specifically, TDZ__Exit=current time$-t_{exit}$ If that time (TDZ__EXIT) is greater than the actual time and the vehicle entered the detection zone (m__ZonalEntryTime) (operation 67) then the vehicle's exit time (m__linkExitTime) is set to the current time (operation 68). If the current time has passed the vehicle's exit time (m__LinkExitTime) (operation 69), the data structure for the vehicle is deleted (operation 70). The process then returns to the point labeled "D".

If either the time (TDZ__EXIT) at which the vehicle must have entered the detection zone if it were to exit at the current time is not greater than the actual time the vehicle entered the detection zone (m_ZonalEntryTime) (operation 67) or the current time has not passed the vehicle's exit time (operation 69), the data structure for the vehicle is not deleted and the process returns to the point labeled "D".

If a queue exists for the lane (the current queue was not 0 as determined in operation 62), then the process determines if the vehicle has arrived in queue (operations 63, 64 and 65), similar to operations 54, 56 and 57 described above, and flow returns to operation 58.

The estimates for each lane are converted to queue and content for each movement. The method consists of the different rule sets shown in FIG. 6. These sets of rules submit their recommendation to the event list 24*b* as shown in FIG. 6.

The demand rules 21 consider the queue and content for each allowable movement at the intersection and based on that information, submit a recommended movement to the event list 24*b*. This recommendation includes the NEMA movement code for the recommended movement, the time to implement the current movement, and a priority (e.g., priority=queue+content) for each movement.

The progression rules 22 submit recommendations based on the signal states at the adjacent intersections (e.g., intersections N+1 and N-1 in FIG. 2). The priorities for these movements are based on the expected number of vehicles from the adjacent intersections that will request this movement. The time to implement these movements is the approximate travel time from the upstream intersection to node N.

The urgency rules 23 consider the occupancy of the upstream detector for each approach into the node. If the occupancy for any of the detectors on an approach is 100% for too long then this rule set will schedule a movement to service that approach. The priority for these movements is based on the maximum number of vehicles that could be present, or stored, in the detection zone of the approach. For example, the priority could be set to a static number that is based on the length of the detection zone, the numbers of lanes and the average size of the vehicles. Accordingly, for two 400 foot lanes, the storage might be 2*400/20=40 vehicles.

The process, according to the invention, compares the priorities for the different movements that have been submitted for the current time and selects the best movement to control the intersection.

Figure 11:
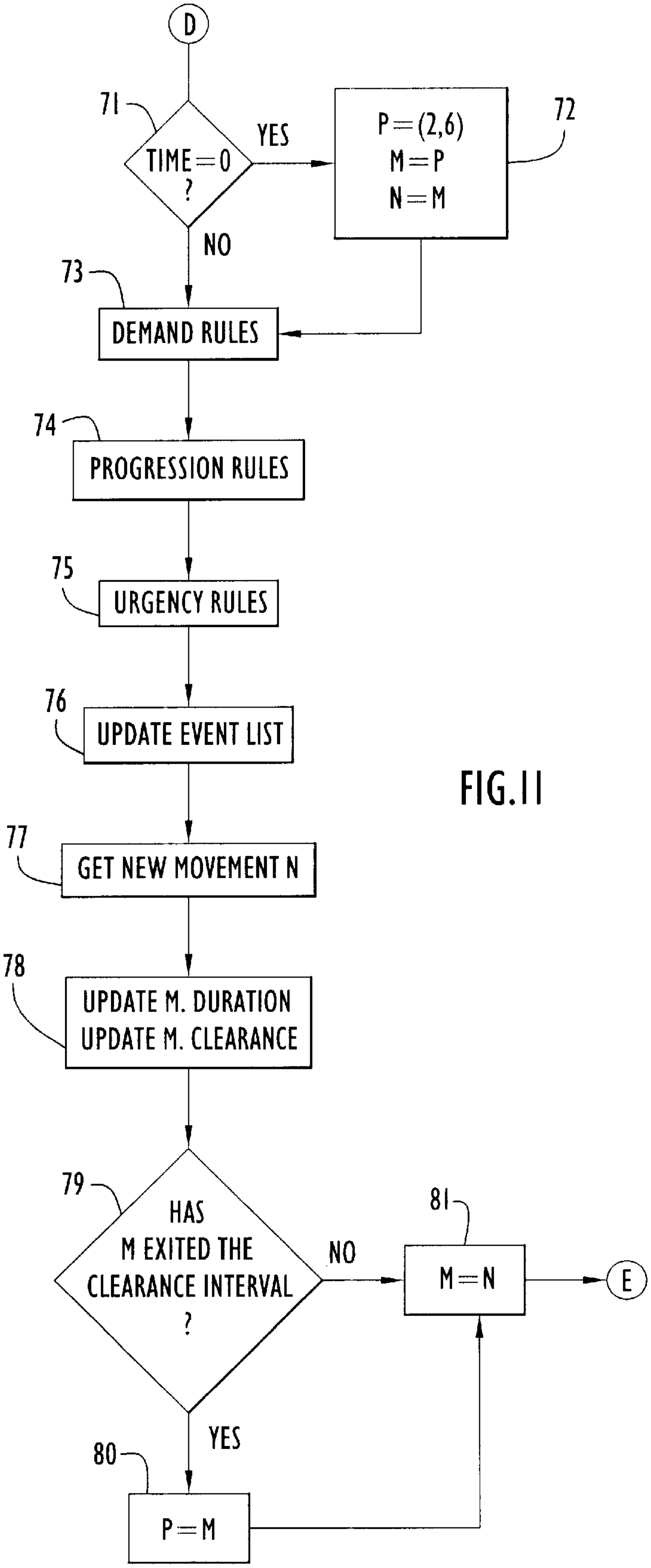
FIG. 11 is a flowchart showing signal state determination according to an aspect of the invention.

FIG. 11 is a flowchart illustrating the process that determines the near optimal signal-state for the intersection. The process begins at the point labeled "D" in FIG. 8. If the time is determined to be the initial start time (i.e., time ="0") (operation 71), then the new movement for the intersection (N), the current movement for the intersection (M), and the previous movement for the intersection (P) are all set to the NEMA movement code (2,6) (operation 72). The process then flows to operation 73 to evaluate the various rules. Likewise, if in operation 71 the time does not equal "0" the process flows directly to operation 73 to begin evaluating the various rules.

Next the demand rules (operation 73), the progression rules (operation 74), and urgency rules (operation 75) submit their recommended movements to the event list 24*b*. The event list is updated to reflect the current queue lengths at the intersection for the movements recommended by the progression rules (operation 76), and a new movement N is obtained (operation 77) from the event list. Next, movement parameters, m_clearance and m_duration, for M are updated (operation 78). If the current movement M has just exited the clearance interval (operation 79), then the previous movement P is updated to be set to the current movement M (operation 80). After operation 80, or if M has not exited the clearance interval in operation 79, the new movement N is copied to the current movement M (operation 81), which will be implemented at the intersection.

Figure 12:
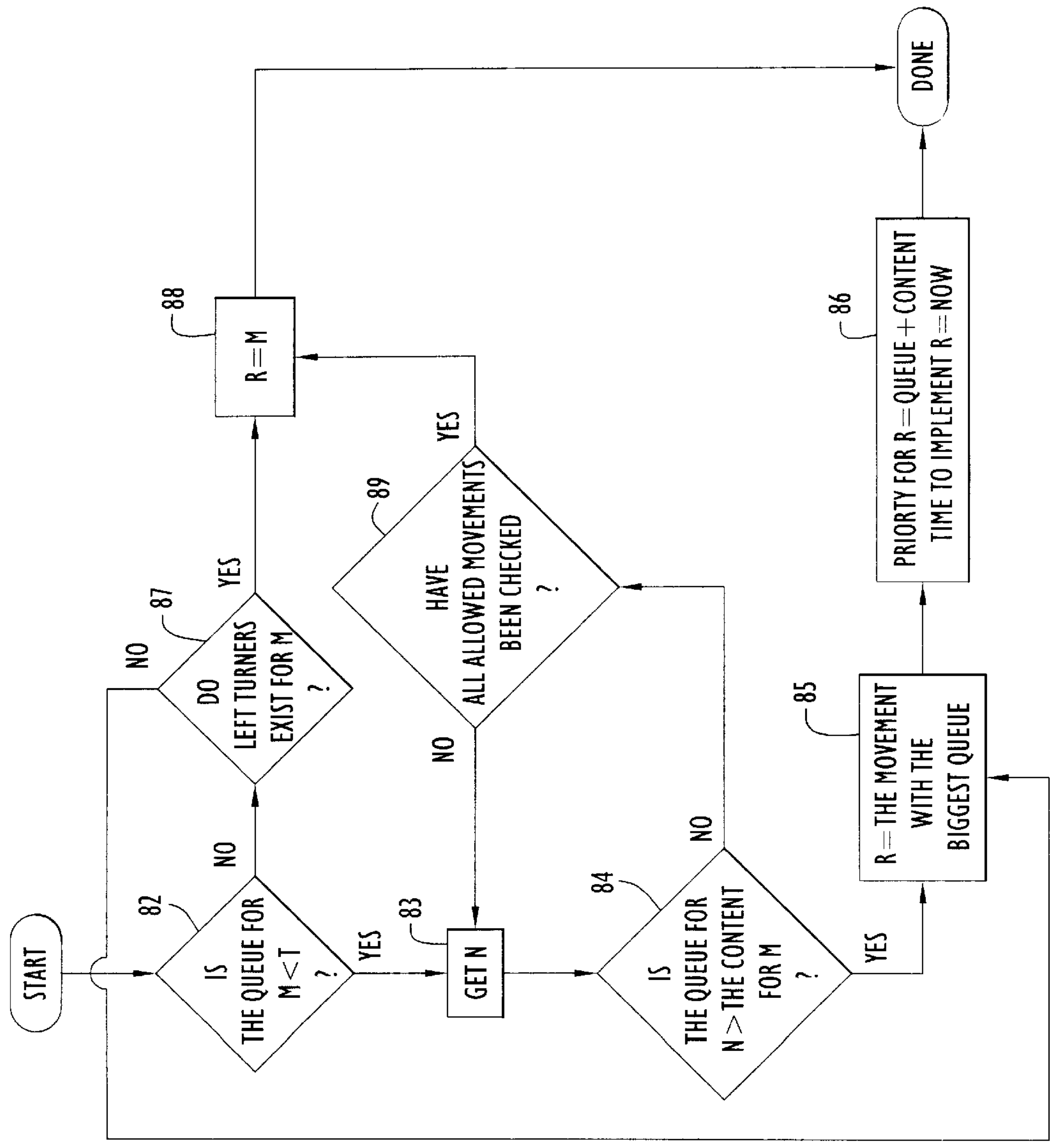
FIG. 12 is a flowchart illustrating the demand rules according to an aspect of the invention.

FIG. 12 is a flowchart illustrating demand rules that can be used in the adaptive traffic control process. In FIG. 12, M is the current movement for the intersection, N is a possible new movement, T is the number of vehicles that can exit the queue during the clearance interval, and R is the recommended movement. If the queue for the current movement M is below the threshold T (operation 82), then the process checks all allowable movements, by getting movement N (operation 83), to determine if the queue for any of those allowable movements is greater than the content for the current movement M (operation 84). If so, the recommended movement R is set to the allowable movement with the largest queue (operation 85), and the priority for that recommended movement R is set to queue +content, and the time to implement R is set to the current time (operation 86). The demand rule process then completes.

If the queue for the current movement M is not below the threshold T (operation 82) but no left turners exist for M (operation 87), then the recommended movement R is again set to the movement with the largest queue (operation 85). If the queue for the current movement M is above the threshold T and there are left turners demanding service from M then the recommended movement R is set to the current movement M (operation 88), and the demand rule process completes.

Figure 13:
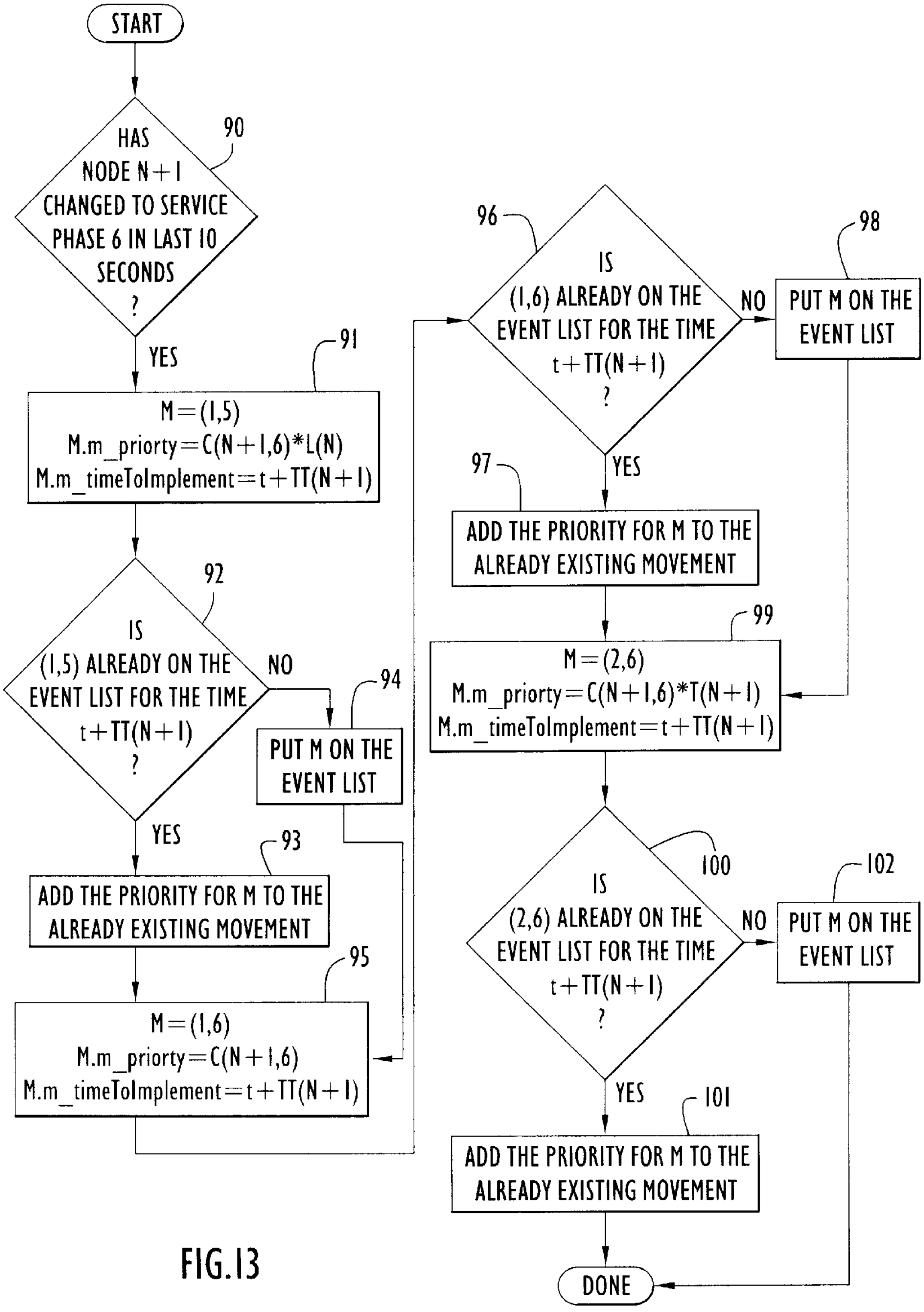
FIG. 13 is a flowchart showing progression rules for NEMA phase 6 according to an aspect of the invention.
Figure 14:
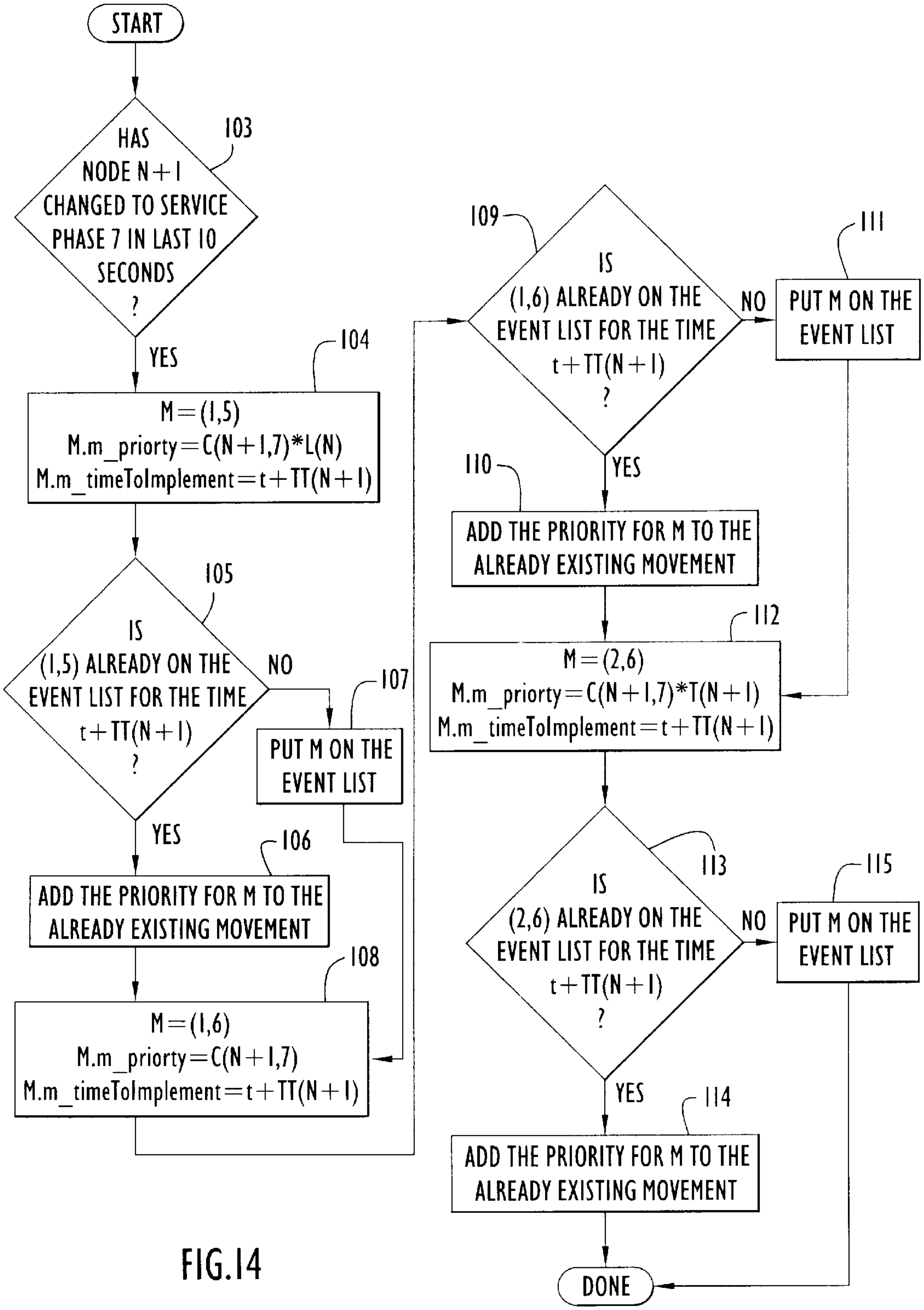
FIG. 14 is a flowchart showing progression rules for NEMA phase 7 according to an aspect of the invention.
Figure 15:
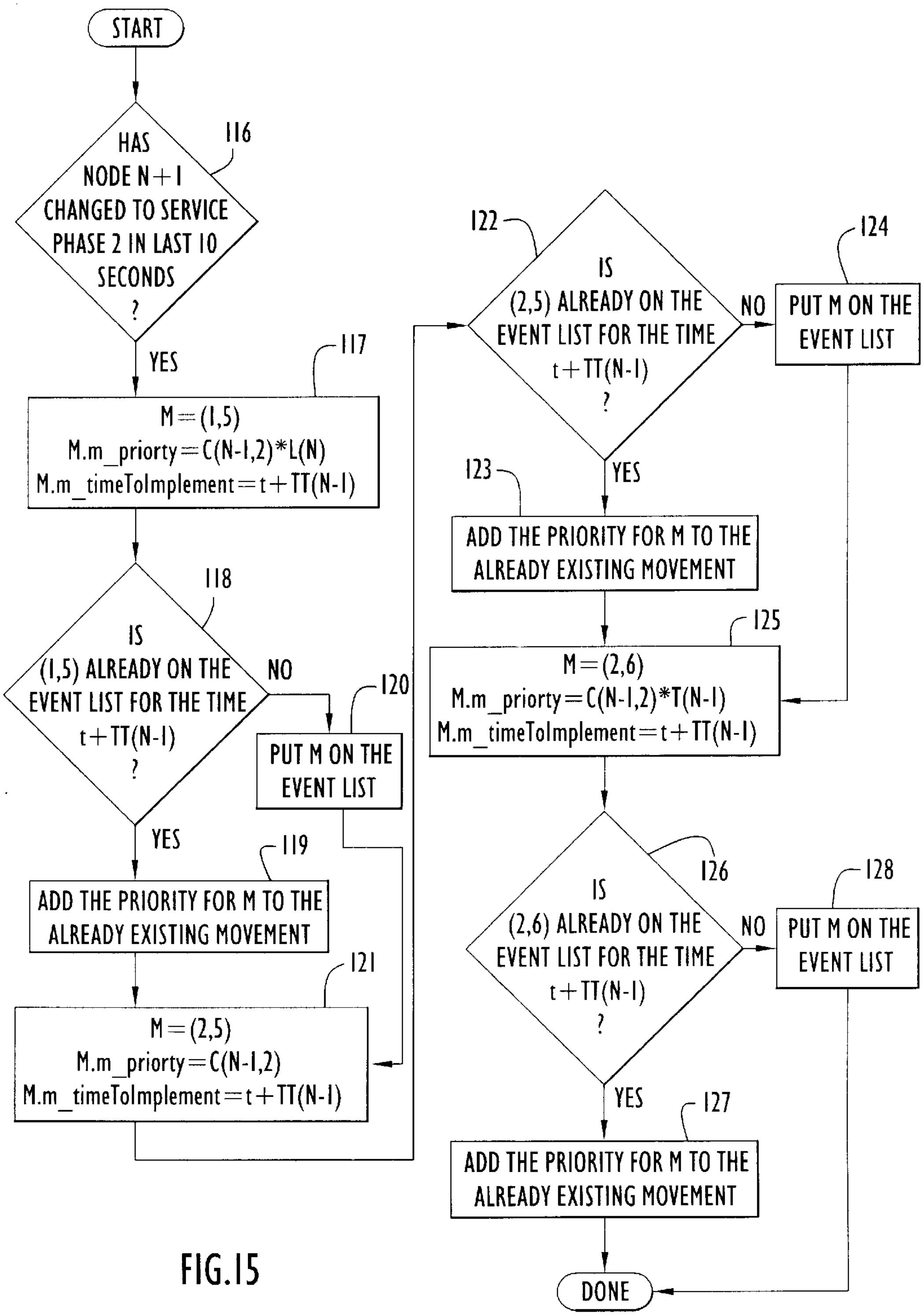
FIG. 15 is a flowchart showing progression rules for NEMA phase 2 according to an aspect of the invention.

FIGS. 13, 14, 15 and 16 are flowcharts that illustrate progression rules for different phases that can be used in the adaptive traffic control process. FIG. 13 illustrates a process for progression rules for phase 6, FIG. 14 for phase 7, FIG. 15 for phase 2, and FIG. 16 for phase 3. Each of the processes shown in those figures is executed sequentially. Since the flowcharts are almost identical, a description for FIG. 15 is now provided that is applicable also to FIGS. 13, 14 and 16, unless noted otherwise.

Figure 16:
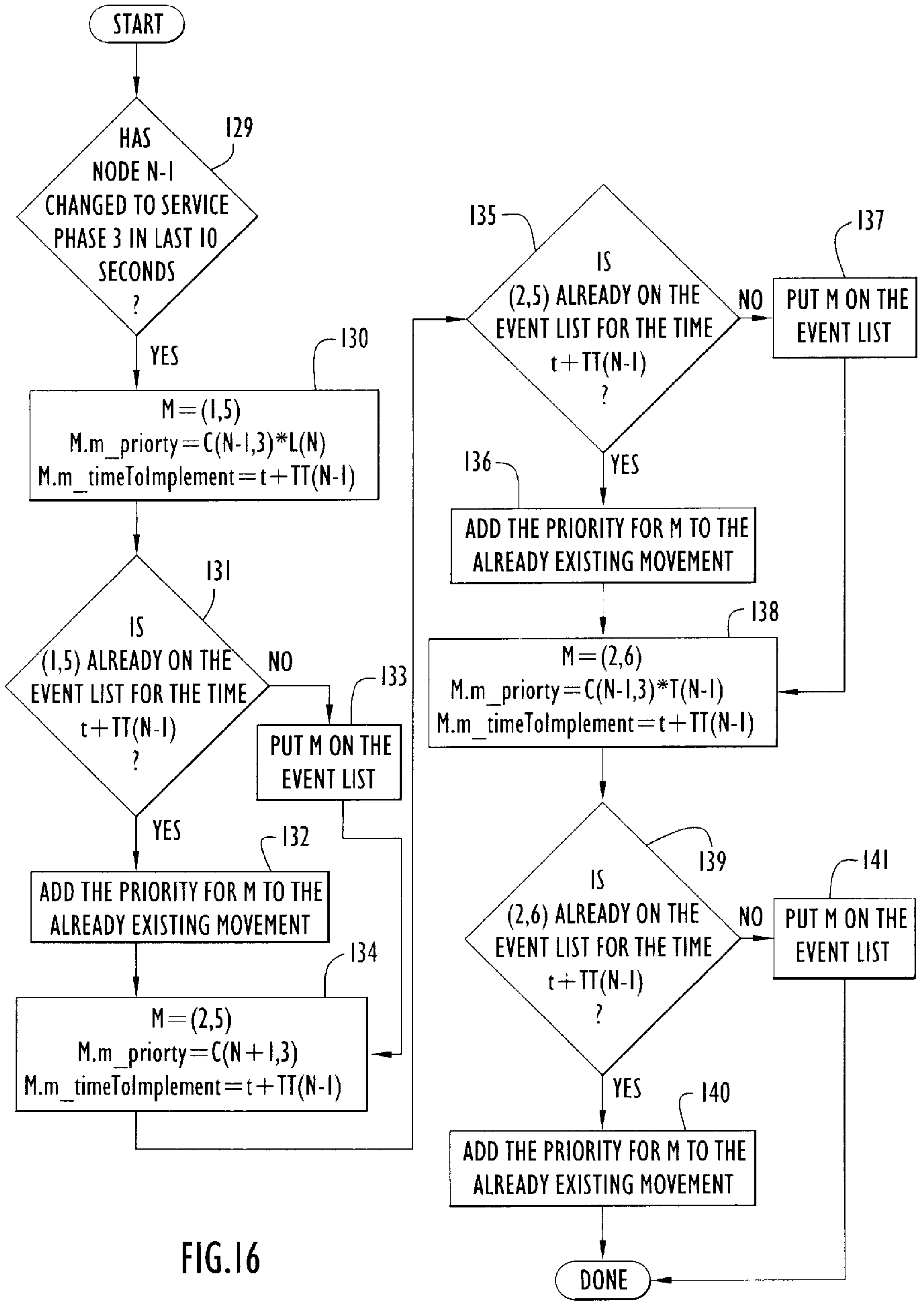
FIG. 16 is a flowchart showing progression rules for NEMA phase 3 according to an aspect of the invention.

Referring to FIG. 2, if the traffic signal at node N-1 has changed to service NEMA phase 2 within the preceding 10 seconds (operation 116) then node N will need to schedule certain movements in the future to coordinate the vehicles arriving from node N-1. The first movement that is scheduled is a (1,5) movement. It is scheduled by setting the current movement to be scheduled M to phase (1,5) (operation 117). In FIG. 16, showing progression rules for another phase of node N-1, the current movement M will be set to the corresponding phase. Similarly, in FIGS. 13 and 14, showing progression rules for phases of node N+1 that will produce vehicles approaching node N, the current movement M will be set to the corresponding phase. The priority for the scheduled movement, M.m priority, is set to the number of vehicles progressing from node N-1 that will turn left at node N, which can be expressed by C(N-1, 2)*L(N) (operation 117). Here, C(N-1, 2) is the number of vehicles that will approach node N from node N-1 for phase 2, and L(N) is the percentage of vehicles that will turn left from node N. This movement M is scheduled to occur when the vehicles will arrive at node N. Accordingly, the movement parameter M.m_timeToimplement, is set to time t+TT (N-1), where t is the current time, and TT(N-1) is the travel time from node N-1 (operation 117).

If this movement currently exists on the event list (operation 118), then the priority for the new movement M is used to update the priority of the movement already on the event list (operation 119). If this movement does not currently exist on the event list, it is placed there (operation 120).

This process is repeated for the other movements that would service the vehicles approaching node N from node N-1, in operations 121 through 124 for phase (2,5) and in operations 125 through 128 for phase (2,6).

Figure 17:
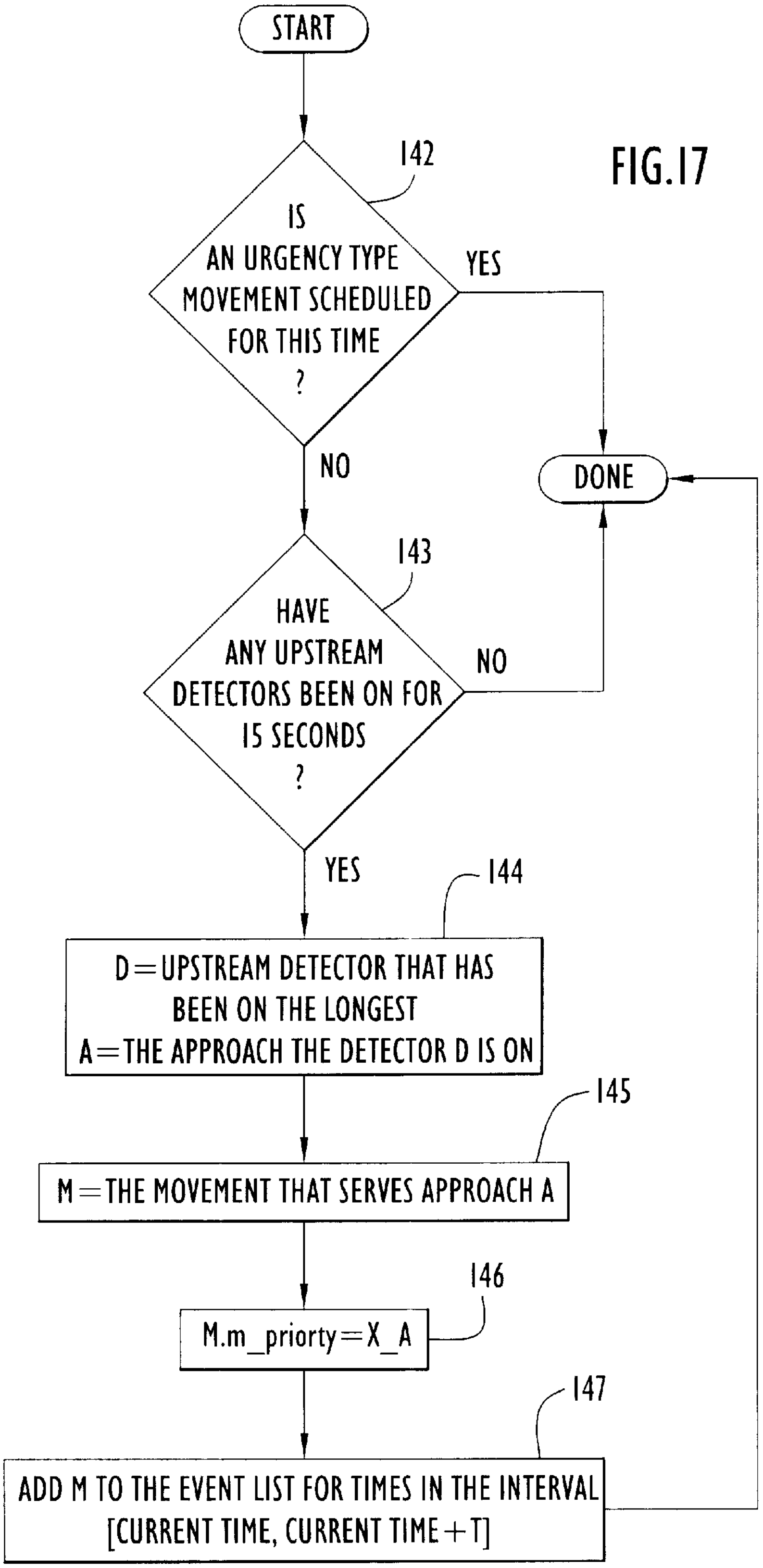
FIG. 17 is a flowchart showing the urgency rules according to an aspect of the invention.

FIG. 17 is a flowchart illustrating urgency rules that can be used in the adaptive control process. If an urgency movement has not already been scheduled for the current time (operation 142) and at least one upstream detector has been on continually for 15 seconds (operation 143) then the method will schedule movements to clear the approach that the detector is on. More particularly, the upstream detector that has been on the longest is identified as detector D, and the corresponding approach on which detector D is located, is identified as approach A (operation 144). The movement that serves approach A is identified as movement M (operation 145). The process then sets a priority for movement M, M.m_priority, equal to X_A, which is the maximum number of vehicles that can be stored on approach A (operation 146). The movement M is added to the event list for times in the interval (current time, current time +T), where T is the amount of time the traffic signal must be green for the X_A vehicles to exit the intersection (operation 147). The process then completes. Also, if an urgency type movement is already scheduled for the current time, or if no upstream detector has been on for the predetermined amount of time (e.g., 15 seconds), then the process completes.

For example, referring to FIG. 2, if the upstream detector in the left lane of the southbound approach at node N has been on for 15 seconds, the method will schedule several (3,8) movements to clear the approach. The priority for these movements is the maximum number of vehicles that can be present, or stored, on the left approach in the detection zone. The movements will be scheduled at the current time and subsequent future times for the amount of time it will take to service all the vehicles in the detection zone on the approach.

Figure 18:
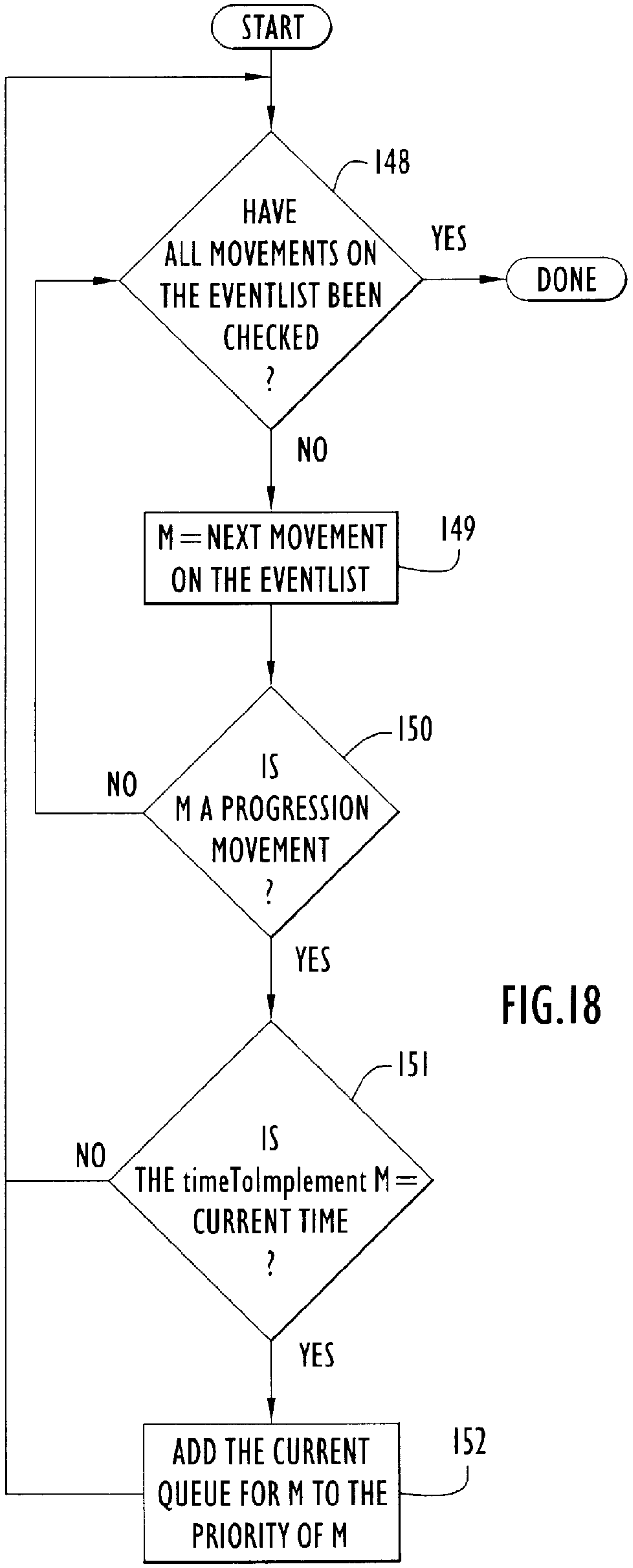
FIG. 18 is a flowchart for updating of the event list according to an aspect of the invention.

FIG. 18 is a flowchart that describes how the movements on the event list are updated. An adaptive traffic control process according to the invention checks each movement that might be implemented at the current time to see if that movement is a progression type movement (operations 148 through 151). If it is, then that movement was scheduled in the future, and its priority does not reflect the current queue at the intersection. As a result, the current queue for vehicles requiring service from that movement is added to the priority for the movement (operation 152).

Figure 19:
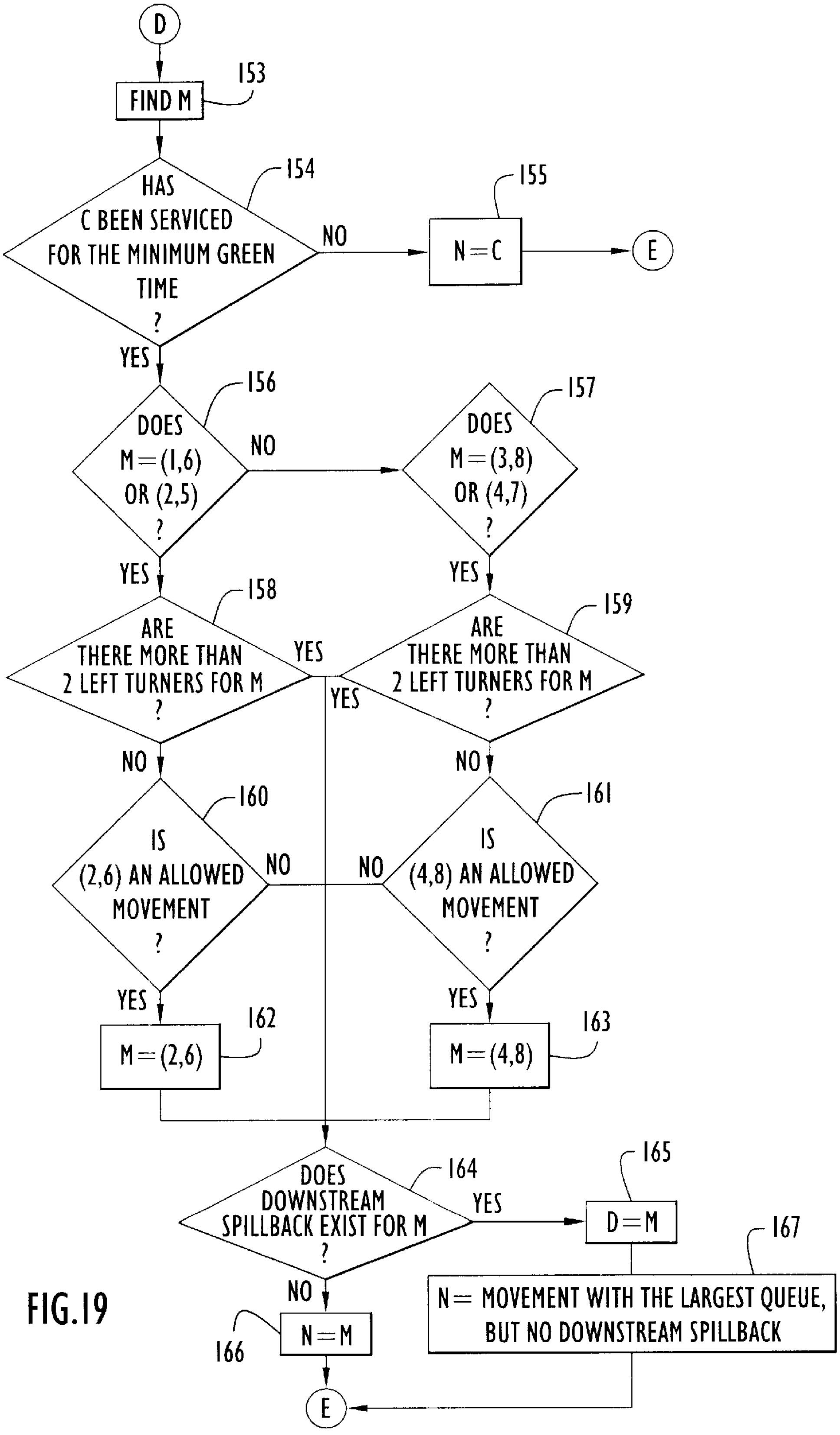
FIG. 19 is a flowchart for choosing an appropriate signal state from the event list according to an aspect of the invention.

As shown in FIG. 6, the event list 25 contains several candidate movements that have been scheduled for the current time. FIG. 19 is a flowchart that illustrates how the appropriate signal-state is chosen, and begins at the point labeled "D" in FIGS. 8 and 19. The current movement M is located (operation 153), and if it has not serviced vehicles at the intersection for the minimum green time (operation 154) then the new movement N is set to the current movement M (operation 155). If the current movement C has been on for the minimum green time then the movement M with the largest priority from the event list is considered as the new movement for the intersection. If M services left turners ((1,6) or (2,5) or (3,8) or (4,7)) (operations 156 and 157) and there are fewer than two vehicles demanding a left turn (operations 158 and 159), then the process changes M to a (2,6) movement for main streets or a (4,8) movement for cross streets if those movements are allowed movements (operations 160 through 163). If the (2,6) or (4,8) movements are not allowed at the intersection (operations 160 and 161) or there is a larger demand for left turn service the candidate (operations 158 and 159) movement M remains the same. If downstream spillback does not exist on the approaches receiving traffic from the movement M (operation 164), then the new movement N is set to movement M (operation 166). However, if there is spillback for M, then the desired movement is set to M (operation 165) and the new movement N is set to the movement with the largest queue but with no spillback on its sink approaches (operation 167). This process then returns to the point labeled "E" in FIGS. 8 and 19.

It will be understood that the processes shown in the flowcharts here can be implemented using computer program code, without undue experimentation, as would be understood by a skilled artisan.

Simulation Results

Simulation results for three different arterials with increasing geometrical and traffic pattern complications indicate that the method is capable of significantly increasing the throughput of the network and reducing the delay through the network by at least 20%. In addition, the method has been successfully tested in an embedded environment (INTEL 386 controller board) and delay for an arterial near saturation was reduced from 51 seconds/vehicle to 29 seconds/vehicle.

Alternatives

While the invention has been described in terms of controlling a traffic signal employed on roads to control the flow of automobile traffic, it is not limited to use only with automobile traffic, but could be used with other types of vehicular traffic. In general, the methods described here can be used to control different types of processes, other than automobile traffic. These methods can be used in any process where only a few servers (e.g., traffic movements) are used to serve many customers (e.g., vehicles from different and conflicting movements). For example, the methods described here could be used in a manufacturing operation using intersecting assembling lines conveying parts that are being assembled according to varying specifications. Since those parts would take different routes along the various assembly lines in the course of their assembly, control would be needed to route the parts efficiently among the assembly lines. The present invention could be used in such an operation to effect the needed control.

Having described preferred embodiments of an adaptive traffic signal control method and apparatuses using such methods, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

Appendix

The following is an example of a data dictionary that can be used with the invention described above.

For the Detector Class:

m_id—id of the detector m_detInfo—current information at the detector m__length—length of the detector m__type—type of detector (presence or pulse)

m__Approach—pointer to the structure that contains information about the approach the detector is on m__distanceFromDownstreamNode—distance detector is from the downstream node m__lane—point to the structure that contains information about the lane the detector is located in m__currentVehicleLeft—partial vehicle that will turn left that has just activated the detector m__currentVehicleThru—partial vehicle that will go through the intersection that has just activated the detector m__currentVehicleRight—partial vehicle that will turn right at the intersection that has just activated the detector m__activationTime—time that the detector was just activated (to within 0.1 seconds)

m__deactivationTime—time that the detector was just deactivated (to within 0.1 seconds)

For the Node Class:

m__changed6—(See FIG. 3) Is 1 if the phase at node N-1 has just changed to a6.

m__changed3—(See FIG. 3) Is 1 if the phase at node N-1 has just changed to a3.

m__changed2—(See FIG. 3) Is 1 if the phase at node N+1 has just changed to a2.

m__changed7—(See FIG. 3) Is 1 if the phase at node N+1 has just changed to a2.

m__id—id for the node.

m__leftApproach—points to the structure that contains the information about the approach directly to the left of the node m__rightApproach—points to the structure that contains the information about the approach directly to the right of the node m__upApproach—points to the structure that contains the information about the approach directly above the node m__downApproach—points to the structure that contains the information about the approach directly above the node m__currentMovement—contains the current movement at the node (see the movement class)

m__prevMovement—contains the previous movement at the node (see the movement class)

m__desiredMovement—contains the desired movement at the node (see the movement class)

m__MovementList—A list of possible movements allowed at the node m__EventList—A list of movements that have been scheduled for the node m__upnodePhase1—(See FIG. 3) phase 1 at node N+1 m__upnodePhase2—(See FIG. 3) phase 2 at node N+1 m__dnnodePhase1—(See FIG. 3) phase 1 at node N-1 m__dnnodePhase2—(See FIG. 3) phase 2 at node N-1 m__upnodeContent6—Content approaching node N from node N-1 from movement 6 m__upnodeContent7—Content approaching node N from node N-1 from movement 7 m__dnnodeContent2—Content approaching node N from node N+1 from movement 2 m__dnnodeContent3—Content approaching node N from node N+1 from movement 3

For the Approach Class:

m__id—id for the approach m__upnode—id of the upstream node of the approach m__dnnode—pointer to the structure for the downstream node m__listOfLanes—pointers to the structures for each of the lanes on the approach m__listOfDetectors—pointers to the structures for each of the upstream detectors on the approach m__listOfStopBarDetectors—pointers to the structures for each of the stop bar detectors on the approach m__length—length of the approach m__storage—maximum number of vehicles that can be stored on the vehicle m__freeFlowSpeed—free flow speed for the approach m__travelTime—travel time for the approach m__opposingApproach—pointer to the structure of the approach that opposes this one m__leftMovementPercent—percentage of vehicles that turn left from this approach m__thruMovementPercent—percentage of vehicles that go through the intersection from this approach m__rightMovementPercent—percentage of vehicles that turn right from the intersection m__numOfFullLanes—number of full lanes on the approach m__numOfLeftTurnBays—number of left turn bays on the approach m__numOfRightTumBays—number of right turn bays on the approach m__lengthOfLeftBay—length of left turn bay m__lengthOfRightBay—length of right turn bay For the Movement Class:

m phase1—(See FIG. 3) phase 1 of the NEMA movement code m phase2—(See FIG. 3) phase 2 of the NEMA movement code m duration—amount of time this movement has been active m clearance—amount of time this movement has been active minus the clearance times m__SourceApproach1—pointer to the first approach that feeds this movement m__SourceApproach2—pointer to the second approach that feeds this movement m__permittedApproach1—(−1) for NA, 0 if permitted movement not allowed, 1 if permitted movement allowed for approach 1 m__permittedApproach2—(−1) for NA, 0 if permitted movement not allowed, 1 if permitted movement allowed for approach 2 m__SinkApproach1—pointer to the first approach where the vehicles exit m__SinkApproach2—pointer to the second approach where the vehicles exit m__listOfLanes—list of pointers to lanes that are serviced by this movement m__queue—number of vehicles that are in queue for this movement m__content—number of vehicles that are in the detection zone for this movement m__demand—content minus queue for the movement m__effectiveNumOfLanes—number of lanes serviced by the movement m__yellowDuration—yellow duration for the movement m__redDuration—all red duration for the movement m__priority—priority for the movement m__timeToImplement—time the movement to be implemented at the intersection m__type—type of movement 0 for demand, 1 for progression, 2 for urgency, 3 for pretimed m__minGreenNoPeds—minimum green time for the movement when no pedestrians are present m__minGreenPeds—minimum green time for the movement when pedestrians are present For the Vehicle Class:

m__id—id for the vehicle m__destinationLane—pointer to the destination lane for the vehicle m__DetectorActivationTime—the time at which this vehicle activated the detector m__DetectorDeactivationTime—the time at which this vehicle cleared the detector (−100 if detector has not been cleared)

m__ZonalEntryTime—the time this vehicle entered the detection zone (−100 if detector is not cleared)

m__QueueEntryTime—the time the vehicle entered the queue (−100 if vehicle is not in queue)

m__LinkExitTime—the time the vehicle will exit the intersection (−100 if vehicle will not pass through the intersection)

m__speed—initial estimate for the vehicle's speed, when it entered the detection zone m__distanceToDownStreamNode—vehicle's distance to the downstream intersection m__contribution—percentage corresponding to the turning movement that the vehicle will complete m__waitTime—amount of time the vehicle has waited for service For the Lane Class:

m__id—id for the lane m__type—type of lane (full or turn bay)

m__Approach—pointer to the approach the lane is on m__length—length of the lane m__storage—storage capacity of the lane m currentQueue—number of vehicles currently in queue in the lane m__currentContent—number of vehicles currently in the detection zone on this lane m__backOfQueue—length of the queue m__leftMovementPercent—left turning movement for the lane m__thruMovementPercent—percentage for the through movement of this lane m__rightMovementPercent—right turning movement for the lane m__detector—pointer to the upstream detector that is in this lane m__stopBarDetector—pointer to the stop bar detector that is in this lane m__listOfVehicles—list of vehicles that are in the detection zone and in this lane m__opposingLanes—list of pointers to lanes that oppose this lane m__ProtectedSFR—protected saturation flow rate for this lane m__PermittedSFR—permitted saturation flow rate for this lane m__lossTimel—start up loss time for the first vehicle in queue m__lossTime2—start up loss time for the second vehicle in queue m__lossTime3—start up loss time for the third vehicle in queue m__lossTime4—start up loss time for the fourth vehicle in queue m__lossTime5—start up loss time for the fifth vehicle in queue m__ac—constant acceleration for this lane m__dc—constant deceleration for this lane m__StopBarActivationTimes—list of stop bar activation times

What is claimed is:

1. A method of controlling traffic at an intersection, comprising:

detecting traffic status;

estimating queue information based on the detected traffic status; and determining a movement of a vehicle in the intersection by evaluating rules using the estimated queue information; and controlling a state of a traffic signal to effect the movement;

wherein the rules include demand rules based on the estimated queue information and a number of vehicles that can exit the queue during said state of the signal; progression rules based on traffic movements at an adjacent intersection; and urgency rules based on an amount of time a vehicles waits to move in the intersection.

2. The method of claim 1, wherein the traffic status is detected in real-time.

3. The method of claim 1, wherein the rules include setting a priority for the determined movement, wherein the priority set by the demand rules is based on the queue information and a number of vehicles approaching the intersection but not in the queue.

4. The method of claim 1, wherein the rules include setting a priority for the determined movement, wherein the priority set by the progression rules is based on a number of vehicles approaching the intersection from an adjacent intersection.

5. The method of claim 1, wherein the rules include setting a priority for the determined movement, wherein the priority set by the urgency rules is based on the maximum number of vehicles waiting in the queue at the intersection.

6. The method of claim 1, wherein the rules include setting a priority for the determined movement, and the method further comprising adding the determined movement and the priority to an event scheduler, and selecting from the event scheduler and based on priority a movement for controlling a state of a traffic signal to control the traffic at the intersection.

7. The method of claim 1, wherein a detection zone is a distance along an approach to the intersection having a detector disposed at one end of the detection zone a predetermined distance from the intersection, and the intersection at another end of the intersection, and wherein the detector detects the vehicle when it enters the detection zone, and wherein estimating the queue information is performed by determining a time the vehicle entered the detection zone if the vehicle arrived in the queue at a current time.

8. The method of claim 1, wherein the queue information relates to a queue of vehicles within a detection zone having an entry point and an exit point, the queue having a front and back, and said estimating queue information comprises:

detecting a time a vehicle crosses the entry point of the detection zone;

calculating a time the vehicle would have entered the detection zone if the vehicle is located at the back of the queue at a current time;

comparing the detected entry time with the calculated entry time; and determining that the vehicle has arrived at the back of the queue at the current time if the calculated entry time is greater than the detected entry time.

9. The method of claim 1, wherein the queue information relates to a queue of vehicles at an approach to an intersection, the queue being within a detection zone having an entry point and an exit point, the queue having a front and back, and where the approach is for the vehicles in the queue to move in the intersection across an opposing approach to the intersection, and said estimating queue information comprises:

estimating a number of vehicles in the queue;

estimating a time gap between vehicles traveling in the opposing approach;

determining if the estimated time gap is sufficiently large to allow the vehicles in the queue to complete the movement across the intersection.

10. The method of claim 1, wherein said determining a movement of a vehicle comprises generating a request for a movement of items in a node in response to a state of a control signal corresponding to a state of the traffic signal, wherein generating the request comprises:

selecting a type of movement of an item in the node;

designating the selected movement as a recommended movement if the number of items in a queue for the selected movement cannot exit the queue while the control signal is in said state; and designating a movement with the largest queue if the number of items in the queue for the selected movement can exit the queue while the control signal is in said state; and determining a priority for the designated movement based on a length of the queue.

11. The method of claim 10, wherein said controlling a state of the traffic signal comprises placing the designated movement and the determined priority on an event list to schedule the designated movement for execution.

12. The method of claim 1, wherein said determining a movement of a vehicle comprises generating a request for a movement of items in a present node in response to a state of a control signal corresponding to a state of the traffic signal, wherein generating the request comprises:

detecting if a control signal for a node adjacent to the present node changes states within a predetermined time;

for each type of movement in the present node setting a priority for the movement based on the number of items expected to approach the present node from the adjacent node and the percentage of items that are expected to make the movement in the present node; and performing said controlling a state of the traffic signal using a movement having a high priority.

13. The method of claim 12, further comprising, for each type of movement in the present node, setting a time to evaluate executing the movement according to the priority of the movement based on an amount of time for an item to travel from the adjacent node to the present node.

14. The method of claim 1, wherein said determining a movement of a vehicle comprises generating a request for a movement of items in a present node in response to a state of a control signal corresponding to a state of the traffic signal, wherein generating the request comprises:

detecting if a number of items in an approach to a node exceeds a threshold;

setting a priority for a movement of an item in the node, wherein the priority is based on the number of items in the approach to the node, if the detected number of items exceeds the threshold; and scheduling the movement for execution based on the priority of the movement to control the state of the traffic signal.

15. The method of claim 14, further comprising, scheduling the movement for execution only if the detected number of items exceeds the threshold for a predetermined amount of time.

* * * * *